US008615452B2

(12) United States Patent  (10) Patent No.: US 8,615,452 B2
Bross et al.  (45) Date of Patent: Dec. 24, 2013

(54) DATA REPRESENTATION OF TRANSACTION-TAX-RELATED INFORMATION

(75) Inventors: Wolfgang Bross, Kelterweg (DE); Norbert Heumueller, Holbeinstrasse (DE); Fritz Oesterle, Hauptstrasse (DE); Sunil Gulati, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2882 days.

(21) Appl. No.: 11/081,069

(22) Filed: Mar. 14, 2005

(65) Prior Publication Data

US 2005/0278233 A1      Dec. 15, 2005

Related U.S. Application Data

(60) Provisional application No. 60/575,769, filed on May 28, 2004.

(51) Int. Cl.
*G06F 17/22* (2006.01)
*G07F 19/00* (2006.01)
*G06Q 40/00* (2012.01)

(52) U.S. Cl.
CPC .................................. *G06Q 40/103* (2013.01)
USPC .......................................................... 705/31

(58) Field of Classification Search
USPC .......................................................... 705/31
See application file for complete search history.

(56) References Cited

U.S. PATENT DOCUMENTS

| | | |
|---|---|---|
| 5,335,169 A | 8/1994 | Chong |
| 5,987,429 A | 11/1999 | Maritzen et al. |
| H1830 H | 1/2000 | Petrimoulx et al. |
| 2003/0093320 A1* | 5/2003 | Sullivan .......................... 705/19 |
| 2003/0105687 A1 | 6/2003 | Bross et al. |
| 2003/0233297 A1* | 12/2003 | Campbell ........................ 705/31 |
| 2005/0028174 A1 | 2/2005 | Rossmann |

FOREIGN PATENT DOCUMENTS

| | | |
|---|---|---|
| WO | WO 01/16850 A2 | 3/2001 |
| WO | WO 01/35678 A2 | 5/2001 |
| WO | WO 01/41552 A2 | 6/2001 |
| WO | WO 01/97150 A1 | 12/2001 |
| WO | WO 03/044664 A1 | 5/2003 |

OTHER PUBLICATIONS

Elmasri/Navathe; Fundamentals of Database Systems, Third Edition; Jun. 2000; pp. 41 to 49 and 942 to 943.
Bray, Paoli, Sperberg-McQueen, Maler; Extensible Markup Language (XML) 1.0 (Second Edition); Oct. 6, 2000; pp. 1 to 47.
SABRIX; TaxBay Architecture Guide Version 3.0; Jul. 25, 2001; pp. 1 to 8.

* cited by examiner

*Primary Examiner* — Faris Almatrahi

(57) ABSTRACT

A method of making a data representation of transaction-tax-related information of a transaction in a database or a data file which can be processed by a computer. The transaction is represented by a transaction document having one or more transaction-document lines. The transaction-tax-related information associated with a transaction-document line has one or more taxation levels. The method includes arranging data items representing the transaction-tax-related information in the database or data file according to a data schema for representing transaction-tax information for different jurisdictions, including jurisdictions with different kinds and numbers of taxation levels. The data schema provides a taxation-line entity for each transaction-document line. It also provides a taxation-line-item entity, related to the taxation-line entity, for each taxation level of a transaction-document line. An attribute of the taxation-line-item entity is used to indicate the kind of taxation level represented by the taxation-line-item entity.

29 Claims, 23 Drawing Sheets

```xml
<?xml version="1.0" encoding="UTF-8"?>
<t_square_data_model xmlns:xsi="http://www.w3.org/2001/XMLSchema-instance"
xsi:noNamespaceSchemaLocation="...">
    <calling_application>
        <appl_name>String</appl_name>
        <appl_version>String</appl_version>
        <appl_type>String</appl_type>
        <client_ident>String</client_ident>
        <tax_if_version>String</tax_if_version>
        <authentication>
            <appl_id>String</appl_id>
            <appl_pw>String</appl_pw>
        </authentication>
    </calling_application>
    <tax_engine_details>
        <cs_name>Text</cs_name>
        <cs_version>Text</cs_version>
        <cs_patch>Text</cs_patch>
        <cs_tax_api>Text</cs_tax_api>
    </tax_engine_details>
    <t_square_document>
        <document_header>              <-- START OF DOCUMENT HEADER 7
            <event_type>String</event_type>
            <document>
                <doc_num>String</doc_num>
                <doc_date>yyyymmdd</doc_date>
                <doc_yyyy>String</doc_yyyy>
                <doc_mm>String</doc_mm>
                <fisc_year>Text</fisc_year>
                <fisc_perio>Text</fisc_perio>
                <doc_type>String</doc_type>
                <doc_currency>String</doc_currency>
                <doc_status>String</doc_status>
                <doc_create_date>yyyymmdd</doc_create_date>
                <scan_id>String</scan_id>
                <doc_create_by>String</doc_create_by>
            </document>
            <transaction>
                <trans_type>String</trans_type>
                <trans_sub_type>String</trans_sub_type>
                <credit_indicato String</credit_indicator>
                <loc_currency>String</loc_currency>
                <trans_indicator>String</trans_indicator>
                <txn_time_stamp>Timestamp</txn_time_stamp>
                <payment_terms>String</payment_terms>
                <doc_header_txt>String</doc_header_txt>
                <legal_doc_number>String</legal_doc_number>
                <ref_tax_return>String</ref_tax_return>
                <finance_doc_no>String</finance_doc_no>
                <finance_doc_date>yyyymmdd</finance_doc_date>
            </transaction>
            <other_amunt>Number</other_amunt>
            <gross_amount>
                <gross_amount_loc>Number</gross_amount_loc>
                <gross_amount_doc>Number</gross_amount_doc>
            </gross_amount>
            <discount_amount>
                <disc_amount_loc>Number</disc_amount_loc>
                <disc_amount_doc>Number</disc_amount_doc>
            </discount_amount>
            <net_amount>
                <net_amount_loc>Number</net_amount_loc>
                <net_amount_doc>Number</net_amount_doc>
```

FIG. 10a

```
</net_amount>
<freight_amount>
        <freight_cost_loc>Number</freight_cost_loc>
        <freight_cost_doc>Number</freight_cost_doc>
</freight_amount>
<insurace_amount>
        <insure_amnt_loc>Number</insure_amnt_loc>
        <insure_amnt_doc>Number</insure_amnt_doc>
</insurance_amount>
<customer>  ◄──────────── START OF CUSTOMER 22
        <mycomp_if_cust>Text</mycomp_if_cust>
        <customer_number>String</customer_number>
        <customer_name>String</customer_name>
        <puchase_orga>String</puchase_orga>
        <cust_eco_activ>String</cust_eco_activ>
        <customer_type>String</customer_type>
        <customer_tax_reg>String</customer_tax_reg>
        <tax_exemption>
                <customer_tax_st>String</customer_tax_st>
                <customer_tax_cl>String</customer_tax_cl>
        </tax_exemption>
        <tax_registration>
                <customer_tax_L1>String</customer_tax_L1>
                <customer_tax_L2>String</customer_tax_L2>
        </tax_registration>
        <invoice_sent_to_address>
                <sent_to_street>String</sent_to_street>
                <sent_to_city>String</sent_to_city>
                <sent_to_statecod>String</sent_to_statecod>
                <sent_to_statenam>String</sent_to_statenam>
                <sent_to_zipcode>String</sent_to_zipcode>
                <sent_to_countyc>String</sent_to_countyc>
                <sent_to_countyn>Text</sent_to_countyn>
                <sent_to_country>Text</sent_to_country>
                <sent_to_district>Text</sent_to_district>
                <sent_to_province>Text</sent_to_province>
        </invoice_sent_to_address>
        <sold_to_address>
                <sold_to_street>String</sold_to_street>
                <sold_to_city>String</sold_to_city>
                <sold_to_statecod>String</sold_to_statecod>
                <sold_to_statenam>String</sold_to_statenam>
                <sold_to_zip>String</sold_to_zip>
                <sold_to_country>Text</sold_to_country>
                <sold_to_countyc>Text</sold_to_countyc>
                <sold_to_county>String</sold_to_county>
                <sold_to_district>Text</sold_to_district>
                <sold_to_province>Text</sold_to_province>
        </sold_to_address>
</customer>  ◄──────────── END OF CUSTOMER 22
<vendor>     ◄──────────── START OF VENDOR 21
        <mycomp_if_vend>String</mycomp_if_vend>
        <vendor_number>String</vendor_number>
        <vendor_name>String</vendor_name>
        <vend_eco_activ>String</vend_eco_activ>
        <vend_tax_regno>String</vend_tax_regno>
        <tax_registration>
                <vendor_tax_L1>String</vendor_tax_L1>
                <vendor_tax_L2>String</vendor_tax_L2>
        </tax_registration>
        <bill_frm_address>
                <bill_frm_street>String</bill_frm_street>
                <bill_frm_city>String</bill_frm_city>
```

*FIG. 10b*

```
                        < bill_frm_statec > String < /bill_frm_statec >
                        < bill_frm_staten > String < /bill_frm_staten >
                        < bill_frm_countyc > String < /bill_frm_countyc >
                        < bill_frm_countyn > String < /bill_frm_countyn >
                        < bill_frm_country > String < /bill_frm_country >
                        < bill_frm_distri > Text < /bill_frm_distri >
                        < bill_frm_provi > Text < /bill_frm_provi >
                        < master_timestamp > String < /master_timestamp >
                  < /bill_frm_address >
            < /vendor >                ◄────────── START OF VENDOR 22
            < payment >                ◄────────── START OF PAYMENT 26
                  < paid_date > 19700813 < /paid_date >
                  < bank_ref_num > Text < /bank_ref_num >
                  < check_number > Text < /check_number >
                  < amount_collect > Text < /amount_collect >
                  < vat_amount_rec > Text < /vat_amount_rec >
                  < collect_date > yyyymmdd < /collect_date >
                  < collect_code > Text < /collect_code >
            < /payment >               ◄────────── END OF PAYMENT 26
            < taxation_header >        ◄────────── START OF TAXATION HEADER 4
                  < tax_header_comt > Text < /tax_header_comt >
                  < accrued_tax_amnt > Text < /accrued_tax_amnt >
                  < rounding_rule > Text < /rounding_rule >
                  < other_amount > Text < /other_amount >
                  < exempt_amount > Text < /exempt_amount >
                  < transaction_tax >
                        < tax_amount_loc > Text < /tax_amount_loc >
                        < tax_amount_doc > Text < /tax_amount_doc >
                  < /transaction_tax >
                  < central_sales_tax >
                        < taxform_number_c > Text < /taxform_number_c >
                        < taxform_date_c > yyyymmdd < /taxform_date_c >
                  < /central_sales_tax >
                  < local_sales_tax >
                        < taxform_number_L > Text < /taxform_number_L >
                        < taxform_date_L > yyyymmdd < /taxform_date_L >
                  < /local_sales_tax >
                  < messages >
                        < code > String < /code >
                        < text > String < /text >
                        < category > String < /category >
                        < severity > String < /severity >
                        < location > String < /location >
                  < /messages >
          START   < taxation_header_line >
                        < transaction_tax >
                              < tax_level > Text < /tax_level >
                              < tax_level_value > Text < /tax_level_value >
                              < tax_amount_loc > Text < /tax_amount_loc >
                              < tax_amount_doc > Text < /tax_amount_doc >
REPETITIVE GROUP              < rounding_rule > Text < /rounding_rule >
TAXATION HEADER         < /transaction_tax >
LINE 19                 < messages >
                              < code > Text < /code >
                              < text > Text < /text >
                              < category > Text < /category >
                              < severity > Text < /severity >
                              < location > Text < /location >
           END          < /messages >
                  < /taxation_header_line >
            < /taxation_header > ◄──────── END OF TAXATION HEADER 4
      < /document_header >       ◄──────── START OF DOCUMENT HEADER 7
START  < document_line >
```

FIG. 10c

REPETITIVE GROUP
DOCUMENT LINE 3

```
<doc_line_no>Text</doc_line_no>
<doc_line_txt>Text</doc_line_txt>
<doc_line_quan>Text</doc_line_quan>
<tax_point_date>yyyymmdd</tax_point_date>
<ship_date>yyyymmdd</ship_date>
<posting_date>yyyymmdd</posting_date>
<goods_moved_flag>Text</goods_moved_flag>
<trans_type>Text</trans_type>
<supplemtary_unit>Text</supplemtary_unit>
<group_product_id>Text</group_product_id>
<origin_country>Text</origin_country>
<origin_class>Text</origin_class>
<net_mass>Text</net_mass>
<net_mass_unit>Text</net_mass_unit>
<manufacture_cost>Text</manufacture_cost>
<material_cost>Text</material_cost>
<document_price>Text</document_price>
<document_IC_type>Text</document_IC_type>
<product_kind>Text</product_kind>
<pointof_passage>Text</point_of_passage>
<cust_purchase_no>Text</cust_purchase_no>
<contract_number>Text</contract_number>
<rev_charge_indic>Text</rev_charge_indic>
<delivery_terms>Text</delivery_terms>
<transport_mode>Text</transport_mode>
<cost_location>Text</cost_location>
<price_curr_doc>Text</price_curr_doc>
<tax_rec_percent>Text</tax_rec_percent>
<Weight>
    <gross_li_weight>Text</gross_li_weight>
    <net_li_weight>Text</net_li_weight>
</Weight>
<transaction_tax_amount>
    <tax_amount_loc>Text</tax_amount_loc>
    <tax_amount_doc>Text</tax_amount_doc>
</transaction_tax_amount>
<eQuate>
    <equate_code>Text</equate_code>
    <equate_entity>Text</equate_entity>
    <equate_subentity>Text</equate_subentity>
    <Initiator>
        <initiator_fname>Text</initiator_fname>
        <initiator_lname>Text</initiator_lname>
    </Initiator>
    <to_contact>
        <tocontact_fname>Text</tocontact_fname>
        <tocontact_lname>Text</tocontact_lname>
    </to_contact>
</eQuate>
<EER>
    <eer_co_location>Text</eer_co_location>
    <eer_business>Text</eer_business>
    <eer_receipt>Text</eer_receipt>
</EER>
<sales_order_reference>
    <salesorder_ref>Text</salesorder_ref>
    <salesorder_dat>Text</salesorder_dat>
</sales_order_reference>
<insurance_amount>
    <insure_amnt_loc>Text</insure_amnt_loc>
    <insure_amnt_doc>Text</insure_amnt_doc>
</insurance_amount>
<freight_and_shipping_amount>
```

FIG. 10d

```
            < freight_amnt_loc > Text < /freight_amnt_loc >
            < freight_amnt_doc > Text < / freight_amnt_doc >
< /freight_and_shipping_amount >
< gross_amount >
            < gross_amnt_loc > Text < /gross_amnt_loc >
            < gross_amnt_doc > Text < /gross_amnt_doc >
< /gross_amount >
< discount_amount >
            < disc_amnt_loc > Text < /disc_amnt_loc >
< /discount_amount >
< net_amount >
            < net_amount_loc > Text < /net_amount_loc >
            < net_amount_doc > Text < /net_amount_doc >
< /net_amount >
< poa_address >
            < poa_city > Text < /poa_city >
            < poa_county > Text < /poa_county >
            < poa_county_name > Text < /poa_county_name >
            < poa_state Text < /poa_state >
            < poa_state_name > Text < /poa_state_name >
            < poa_zip_code > Text < /poa_zip_code >
            < poa_country_code > Text < /poa_country_code >
            < poa_district > Text < /poa_district >
            < poa_province > Text < /poa_province >
< /poa_address >
< poo_address >
            < poo_city > Text < /poo_city >
            < poo_county > Text < /poo_county >
            < poo_county_name > Text < /poo_county_name >
            < poo_province > Text < /poo_province >
            < poo_district > Text < /poo_district >
            < poo_state > Text < /poo_state >
            < poo_state_name > Text < /poo_state_name >
            < poo_zip_code > Text < /poo_zip_code >
            < poo_country_code > Text < /poo_country_code >
< /poo_address >
< customer >
            < ship_to >
                        < ship_to_street > Text < /ship_to_street >
                        < ship_to_city > Text < /ship_to_city >
                        < ship_to_countyc > Text < /ship_to_countyc >
                        < ship_to_countyn > Text < /ship_to_countyn >
                        < ship_to_statec > Text < /ship_to_statec >
                        < ship_to_staten > Text < /ship_to_staten >
                        < ship_to_province > Text < /ship_to_province >
                        < ship_to_district > Text < /ship_to_district >
                        < ship_to_zip > Text < /ship_to_zip >
                        < ship_to_country > Text < /ship_to_country >
                        < ship_to_changes > Text < /ship_to_changes >
            < /ship_to >
< /customer >
< vendor >
            < ship_from >
                        < ship_frm_street > Text < /ship_frm_street >
                        < ship_frm_city > Text < /ship_frm_city >
                        < ship_frm_zip > Text < /ship_frm_zip >
                        < ship_frm_statec > Text < /ship_frm_statec >
                        < ship_frm_staten > Text < /ship_frm_staten >
                        < ship_frm_cntyc > Text < /ship_frm_cntyc >
                        < ship_frm_countyn > Text < /ship_frm_countyn >
                        < ship_frm_country > Text < /ship_frm_country >
                        < ship_frm_distri > Text < /ship_frm_distri >
                        < ship_frm_provin > Text < /ship_frm_provin >
```

FIG. 10e

```xml
        </ship_from>
        <perform_at>
                <perform_street>Text</perform_street>
                <perform_city>Text</perform_city>
                <perform_zip>Text</perform_zip>
                <perform_statec>Text</perform_statec>
                <perform_state>Text</perform_state>
                <perform_countyc>Text</perform_countyc>
                <perform_county>Text</perform_county>
                <perform_country>Text</perform_country>
                <perform_district>Text</perform_district>
                <peform_province>Text</perform_province>
        </perform_at>
</vendor>
<product_material_services>
        <product_number>Text</product_number>
        <product_text>Text</product_text>
        <product_code>Text</product_code>
        <product_line>Text</product_line>
        <product_type>Text</product_type>
        <bundled_service>Text</bundled_service>
        <measure_unit>Text</measure_unit>
        <product_code_cs>Text</product_code_cs>
</product_material_services>
<invoice_reference>
        <invoice_ref_no>Text</invoice_ref_no>
        <invoice_ref_date>yyyymmdd</invoice_ref_date>
</invoice_reference>
<taxation_line>            ◄──────── START OF TAXATION LINE 5
        <tax_class_code>Text</tax_class_code>
        <tax_base>Text</tax_base>
        <rounding_rule>Text</rounding_rule>
        <other_amount>Text</other_amount>
        <calculation_brid>Text</calculation_brid>
        <fi_book_indic>Text</fi_book_indic>
        <fiscal_class>Text</fiscal_class>
        <tax_rule>
                <tax_rule_appl>Text</tax_rule_appl>
                <tax_rule_txt>Text</tax_rule_txt>
        </tax_rule>
        <transaction_tax>
                <tax_amount_loc>Text</tax_amount_loc>
                <tax_amount_doc>Text</tax_amount_doc>
        </transaction_tax>
        <jurisdictional_base>
                <jurisdic_basis>Text</jurisdic_basis>
                <jurisdic_de_txt>Text</jurisdic_de_txt>
        </jurisdictional_base>
        <tax_jurisdiction_applied>
                <jurisdic_code1>Text</jurisdic_code1>
                <jurisdic_code2>Text</jurisdic_code2>
                <jurisdic_t_code>Text</jurisdic_t_code>
        </tax_jurisdiction_applied>
        <freight_forwarder>
                <fw_agency_taxreg>Text</fw_agency_taxreg>
        </freight_forwarder>
        <exemption>
                <determine_appl>Text</determine_appl>
        </exemption>
        <messages>
                <code>Text</code>
                <text>Text</text>
```

FIG. 10f

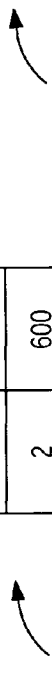
FIG. 12
Taxation Line (5):
| TAXATION LINE | TAXATION LINE NO | DOCUMENT LINE NO | JURIS-DICTION | TAX SUM |
|---|---|---|---|---|
| | 1 | 1 | AR | 85 |
| | 2 | 2 | AR | 120 |
| | 3 | 3 | AR | 120 |
Taxation Line Item (15):
| TAXATION LINE ITEM NO | TAXATION LINE NO | TAXATION LEVEL | TAXATION LEVEL VALUE | TAX AMOUNT |
|---|---|---|---|---|
| 1 | 1 | 1 | IVA | 50 |
| 2 | 1 | 2 | PERCEPCION | 10 |
| 3 | 1 | 3 | GIT | 25 |
| 4 | 2 | 1 | IVA | 60 |
| 5 | 2 | 2 | SURTAX | 30 |
| 6 | 2 | 3 | GIT | 30 |
| 7 | 3 | 1 | IVA | 80 |
| 8 | 3 | 3 | GIT | 40 |
Document Line (3):
| DOCUMENT LINE | DOCUMENT LINE NO | NET AMOUNT |
|---|---|---|
| | 1 | 500 |
| | 2 | 600 |
| | 3 | 800 |

DATA REPRESENTATION OF TRANSACTION-TAX-RELATED INFORMATION

RELATED APPLICATION

This Application is a Nonprovisional Application of a Provisional Application No. 60/575,769, filed on May 28, 2004.

FIELD OF THE INVENTION

The present invention relates generally to data representations of transaction-tax-related information and, for example, to a method of making a data representation of transaction-tax-related information, a computer for performing transaction-tax-related processing and a machine-readable medium and a propagated signal comprising a representation of a transaction document including-transaction-tax related information.

BACKGROUND OF THE INVENTION

A transaction-tax liability is induced by an individual commercial transaction, such as the sale of a good, or the purchase of a service. Typically, the transaction tax is a certain percentage of the price of the good or service. Normally, it is collected by the vendor or service provider, who pays the accumulated transaction tax at certain time intervals to a tax authority (for the sake of simplicity, the following description only mentions the purchase of goods, but it is likewise directed to the provision of services etc.).

Throughout the world, there are many different transaction-tax regulations. Some countries, such as the United States, have a 'sales and use' tax system, in which, if a product is manufactured and sold in a supply chain, all transactions are non-taxable re-sales until a final retail sale to an end-user, which is taxable (unless the end-user can claim a tax exemption). Thus, no tax is applied to a product until it is sold at retail. In a value-added tax system (as exists, for example, in most European countries) in a supply chain the transaction tax in a single individual step corresponds to a percentage of the value added in this step, i.e. to the difference between the amount of money the vendor receives for the sold product and the taxable amount he/she had to spend in order to manufacture or provide the good. In most of the countries the "added value" is not determined in individual transactions, but rather in a cumulated manner; in other countries, however, it is determined in individual transactions.

Furthermore, in many countries, such as the United States and Argentina, the transaction tax is split up into different fragments for different regional authorities, for example in state taxes, county taxes and city taxes, such as in the USA, or in different transaction-tax types, such as IVA, Percepcion, Surtax, and GIT in Argentina (wherein Percepcion and Surtax are exclusive tax types). Such tax fragments are also called "taxation levels". In other countries, such as France, the transaction tax is unitary (e.g. only to be paid to the French State); in other words, there is only one "taxation level". There are different rates in different countries and smaller regional units, such as states, counties and even cities, which may enter in a combined way in the different taxation levels. The tax rate may depend in a way specific for the country, state, etc. on the place of business of the vendor, the location of the buyer, on the origin and/or the destination of the good. It may depend on the kind of good, the type of transaction, the legal status of the vendor or buyer, etc. Moreover, the requirements for transaction-tax related bookkeeping, reporting and the form and period of tax declarations to the tax authorities generally vary from country to country, too.

Consequently, for enterprises that are active in different countries and states, a great deal of time and trouble is needed to fulfill the transaction-tax requirements in an efficient way.

Computerized systems have been designed which enable enterprises to fulfill their transaction-tax liabilities in a computer-assisted way. There are already hundreds of different transaction-tax software solutions worldwide. In one type of solution, a business application, such as an enterprise resource planning (ERP) application, for example, the product R/3 by SAP, also enables the user to deal with the transaction taxes. Another type of solution is a specialized application for transaction-tax calculation and/or reporting, such as "TaxWare", "Sabrix", "Vertex" and "Datev". Further examples of transaction-tax software solutions are disclosed in U.S. Pat. No. 5,335,169 assigned to DSI, U.S. Pat. No. 5,987,429 assigned to SUN Microsystems Inc., U.S. Statutory Invention Registration No. H1,830 assigned to The Dow Chemical Company, International publication No. WO 01/16850 A2 (Applicant: Andersen Consulting, LLP), International publication No. WO 01/35678 A2 (Applicant: ESALESTAX.COM), International publication No. WO 01/41552 A2 (Applicant: Taxware International, Inc.), International publication No. WO 01/97150 A1 (Applicant: Dryden Matrix Technologies, LLC) and Sabrix: TaxBay Architecture Guide, Version 3.0, Jul. 25, 2001.

Many of the known solutions do not provide global coverage. Consequently, in practice, enterprises with worldwide coverage rely on a variety of different transaction-tax software applications, specializing in certain countries or regions all over the world. Since the different solutions are embedded in more comprehensive business solutions, or, in the case of specialized transaction-tax solutions, use their individual data schema, the cost for configuring, maintaining and operating such a variety of different solutions is considerable.

SUMMARY OF THE INVENTION

A first aspect of the invention is directed to a method of making a data representation of transaction-tax-related information of a transaction in a database or a data file which can be processed by a computer. The transaction is represented by a transaction document having one or more transaction-document lines. The transaction-tax-related information associated with transaction-document lines has one or more taxation levels. The method comprises: arranging data items representing the transaction-tax-related information in the database or data file according to a data schema for representing transaction-tax information for different jurisdictions, including jurisdictions with different kinds and numbers of taxation levels. The data schema provides a taxation-line entity for each transaction-document line. The data schema provides a taxation-line-item entity, related to the taxation-line entity, for each taxation level of a transaction-document line. An attribute of the taxation-line-item entity is used to indicate the kind of taxation level represented by the taxation-line-item entity.

According to another aspect, a computer is provided for performing transaction-tax-related processing of transactions. The computer is programmed to input, output or modify a transaction document having one or more transaction-document lines with which one or more taxation levels are associated. The transaction document includes data items representing transaction-tax-related information according to a data schema for representing transaction-tax information for different jurisdictions, including jurisdictions with different kinds and numbers of taxation levels. The data schema provides a taxation-line entity for each transaction-document line, and a taxation-line-item entity, related to the taxation-line entity, for each taxation level of a transaction-document line. An attribute of the taxation-line-item entity is used to indicate the kind of taxation level represented by the taxation-line-item entity.

According to another aspect, a machine-readable medium is provided with data stored on it. The data comprise a representation of a transaction document including transaction-tax-related information according to a data schema for representing transaction-tax information for different jurisdictions, including jurisdictions with different kinds and numbers of taxation levels. The transaction document has one or more transaction-document lines. The transaction-tax-related information associated with transaction-document lines has one or more taxation levels. The data schema provides a taxation-line entity for each transaction-document line, and a taxation-line-item entity, related to the taxation-line entity, for each taxation level of a transaction-document line. An attribute of the taxation-line-item entity indicates the kind of taxation level represented by the taxation-line-item entity.

According to another aspect, a propagated signal carried on an electromagnetic waveform is provided. It comprises a representation of a transaction document including transaction-tax-related information according to a data schema for representing transaction-tax information for different jurisdictions, including jurisdictions with different kinds and numbers of taxation levels. The transaction document has one or more transaction-document lines. The transaction-tax-related information associated with transaction-document lines has one or more taxation levels. The data schema provides a taxation-line entity for each transaction-document line, and a taxation-line-item entity, related to the taxation-line entity, for each taxation level of a transaction-document line. An attribute of the taxation-line-item entity indicates the kind of taxation level represented by the taxation-line-item entity.

Other features are inherent in the methods and products disclosed or will become apparent to those skilled in the art from the following detailed description of embodiments and its accompanying drawings.

DESCRIPTION OF THE DRAWINGS

Embodiments of the invention will now be described, by way of example, and with reference to the accompanying drawings, in which:

FIGS. 10a-10g provide is an XML representation of the data schema underline FIGS. 4 to 9;

FIG. 12 illustrates a relational representation of the exemplary document of FIG. 6;

DESCRIPTION OF THE PREFERRED EMBODIMENTS

Figure 1:
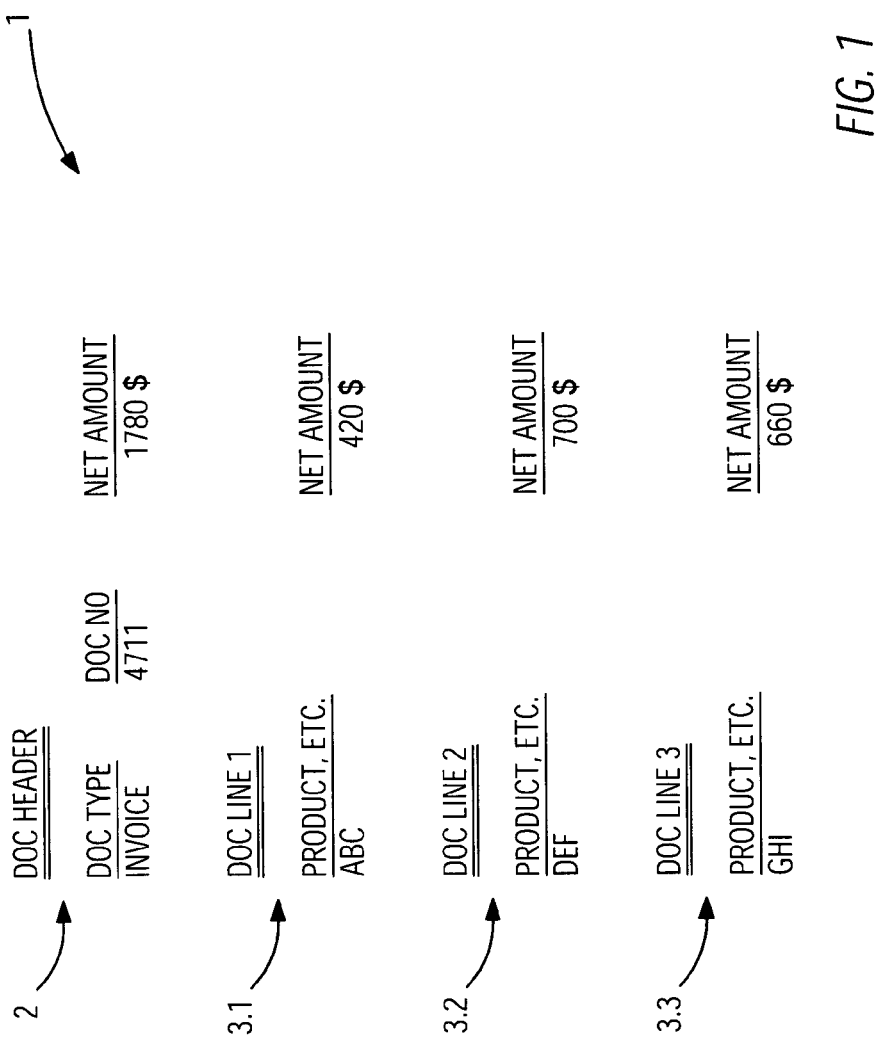
FIG. 1 illustrates an exemplary transaction document, an invoice.
Figure 2:
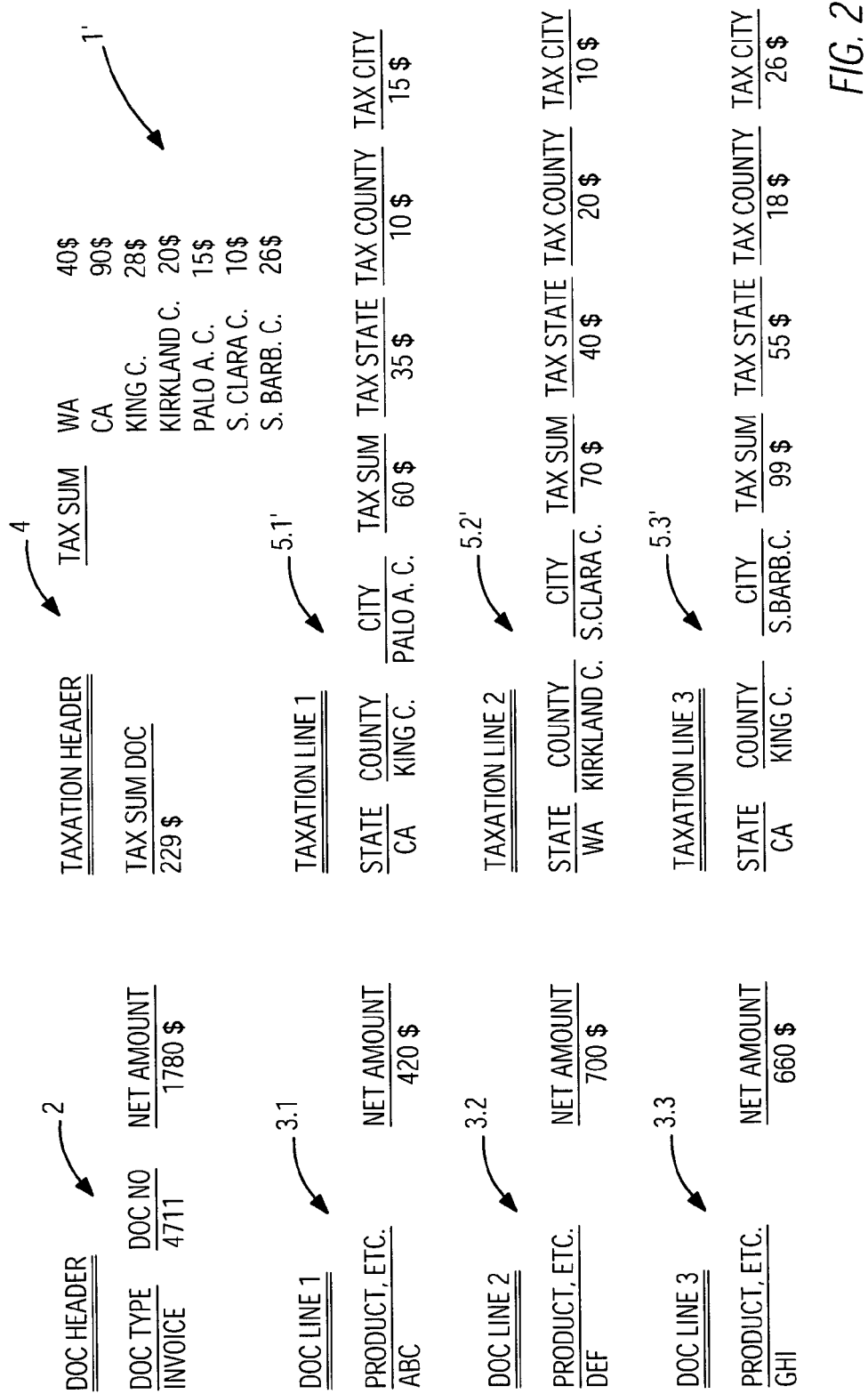
FIG. 2 illustrates the transaction document if FIG. 1 to which exemplary transaction-tax-related data have been added.

FIG. 1 illustrates an exemplary transaction document 1 without transaction-tax data. Such a document 1 typically forms an input to a transaction-tax calculation engine which calculates transaction-tax data and outputs the input-transaction document with added transaction-tax data, as shown in FIG. 2. There are different transaction-document types, for example quotation, order and invoice documents for inbound and outbound transactions. The exemplary transaction-document 1 of FIG. 1 illustrates an invoice (for the sake of simplicity, the following description mainly deals with invoices, but is likewise directed to other transaction types, such as quotations, orders, etc.).

Although an invoice, such as the exemplary invoice 1 may be made out in the form of a paper document, the transaction information contained in it is normally also represented in an electronic form in the issuer's accounting department. For example, the information contained in the invoice 1 may be stored in a database; the collection of data elements, which may be spread over several different files, is considered as the "transaction document", an example of which is shown in FIG. 1. However, if the data belonging to a transaction are to be transmitted over a network, they are often assembled into one file for each transaction. Therefore, the transaction document of FIG. 1 also represents a file containing the data items shown. Such a transmission of transaction documents may, for example, occur when bookkeeping and transaction-tax processing are performed in a distributed way: then, for example, an electronic transaction document, such as the invoice 1, is sent from a general ledger system via a network to a transaction-tax calculation machine.

The transaction document 1 of FIG. 1 has a document header 2 and one or more document sub-items, called document lines, three of which are shown in FIG. 1 and denoted by 3.1, 3.2 and 3.3. The document header 2 contains information valid for all document lines 3, for example data elements indicating the event and document types, a document date (year, month, day), payment terms, a legal document number, data identifying the vendor and the customer, a sent-to-address, a bill-from-address, a document currency, a net amount (which is, for example, the total net amount billed), further amounts such as a freight amount, an insurance amount, a discount amount, a gross amount, and tax related data, such as tax registration numbers and IDs, references to tax returns or other financial documents, payment-related information, such as bank references and account numbers, etc. Three document-header data elements are shown in an exemplary manner in FIG. 1, the document type, the document number and the net amount.

Typically, the transaction represented by the transaction document, such as an invoice, includes sub-transactions, the number of which may vary from document to document. For example, a buyer typically buys several different articles in one purchase; all the articles will then appear in one and the same invoice. Furthermore, sometimes, separate transactions are merged into one transaction document; for example, a service provider may make out a collective invoice in certain periods of time, e.g. monthly, in which all services rendered during this period are collected. The collective invoice then forms the transaction document, and the individual transactions are the sub-transactions represented by the individual document lines 3. The document lines contain sub-transaction-related information, for example a product description, an indication of the kind of product or the product group or class to which the product belongs, the product origin, the product weight or volume, the quantity of identical product items included in the respective document line, destination and shipping related data, and amounts, such as net amount, discount amount, gross amount, freight and shipping amount, insurance amount etc., relating to the respective document line. In the example of FIG. 1, two exemplary data fields are shown on the level of the document lines 3, a "product, etc." data (which symbolizes all the sub-transaction-related data mentioned above) field and a net amount data field. The net amount indicated in the document header 2 equals the sum of the individual net amounts on the document-line level.

Figure 3:
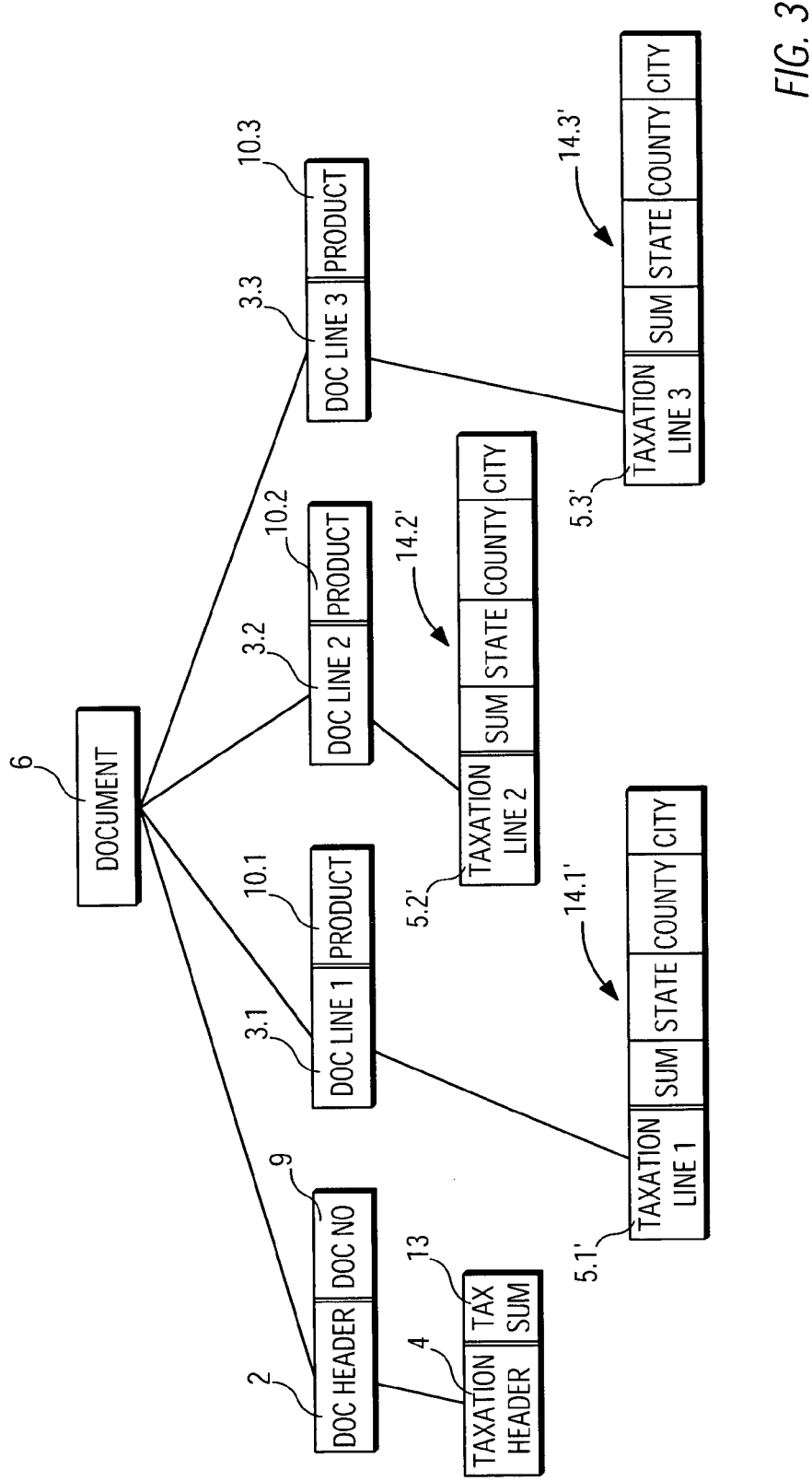
FIG. 3 is a hierarchical diagram illustrating a hierarchical data schema underlying the transaction document of FIG. 2.

FIG. 2 illustrates a transaction document 1' corresponding to the document 1 of FIG. 1 to which transaction-tax related data have been added. FIGS. 2 and 3 do not represent an embodiment with regard to the manner in which the tax-related information is added on the document-line level. Rather, FIGS. 2 and 3 only serve as a means to better understand the embodiments shown in FIGS. 4 to 15 by showing, as a contrast, a usual manner of adding transaction-tax information on the document-line level.

In the transaction document 1' of FIG. 2, a taxation-header entity 4 is added to the document header 2, and a taxation-line entity 5' is added to each of the document lines 3. The taxation-header entity 4 and the taxation-line entities 5' may either be separate entities, assigned to the document header 2 and the document lines 3, or they may be in the form of additional attributes extending the original attributes of the document header 2 and document lines 3. Each taxation-line entity 5.1', 5.2', 5.3' has attributes indicating the state, county and city of the three taxation levels, as well as attributes indicating for the amount of state tax, county tax and city tax, as well as the sum of these three taxes.

When a tax-calculation engine processes a transaction-document 1 of the type shown in FIG. 1, it can infer from the information provided in a document line for which state, county and city (e.g. CA, WA; King County, Kirkland County; Palo Alto City, Santa Clara City, Santa Barbara City) transaction taxes have to be paid, and the corresponding attribute values are written into the taxation-line entity 5'. The tax calculation engine is aware of the different tax rates in the different states, counties and cities and determines, from the net amounts specified in the document lines 3 the amounts of state tax, county tax and city tax of the taxation line. It also calculates the tax sum of the tax sum for each taxation line which is the sum off the taxation line's state, county and city taxes. These values are also written into the taxation-line entity 5', as shown in FIG. 2.

FIG. 3 is a diagram illustrating a hierarchical data schema underlying the transaction document of FIG. 2. An entity is also called "record", and its attributes are also called "data items". Records of the same type are grouped into "record types". A hierarchical data schema has a number of records and parent-child relationships between records (see, for example, I. Navathe et al., Fundamentals of Database Systems, third edition, Addison-Wesley, 2000, pp. 942-943).

In the hierarchical diagram of FIG. 3, the records, including some of their data items, are shown by boxes, wherein the record-type names and the data items are separated by double lines. The root 6 of the hierarchical schema is a record named DOCUMENT, an instance of which is the exemplary transaction document 1' of FIG. 2. The root 6 has a number of children, a document-header 2 and document-line records 3.1', 3.2', 3.3', instances of which are shown in FIG. 2. Some of the data items discussed in connection with FIG. 2 are also shown, such as document-number data item 9 and product-related data items 10.1, 10.2, 10.3. The document-header record 2 and each of the document-line records 3.1, 3.2, 3.3 have a child record for accommodating the transaction-tax related data which are added to an original transaction document 1 by a tax-calculation engine, as explained in connection with the exemplary transaction documents 1 and 1' of FIGS. 1 and 2. The children are, on the header level, a taxation-header record 4, and, on the line level, taxation-line records 5.1', 5.2', 5.3'. Again, some of the taxation-related data items of FIG. 2 are also indicated in FIG. 3, such as the tax sum 13 and data items 14.1', 14.2', 14.3' which relate to the different state, county and city tax amounts and the sum of those amounts. As can be seen in FIG. 3, all the taxation-line related data are arranged in the attributes 14' of the taxation-line records 5'. The different taxation levels that may occur in the jurisdiction considered, such as state, county and city taxes, into the attribute structure of the taxation-line record in a fixed manner. There are no further records on a hierarchy level below the taxation-line level.

Figure 4:
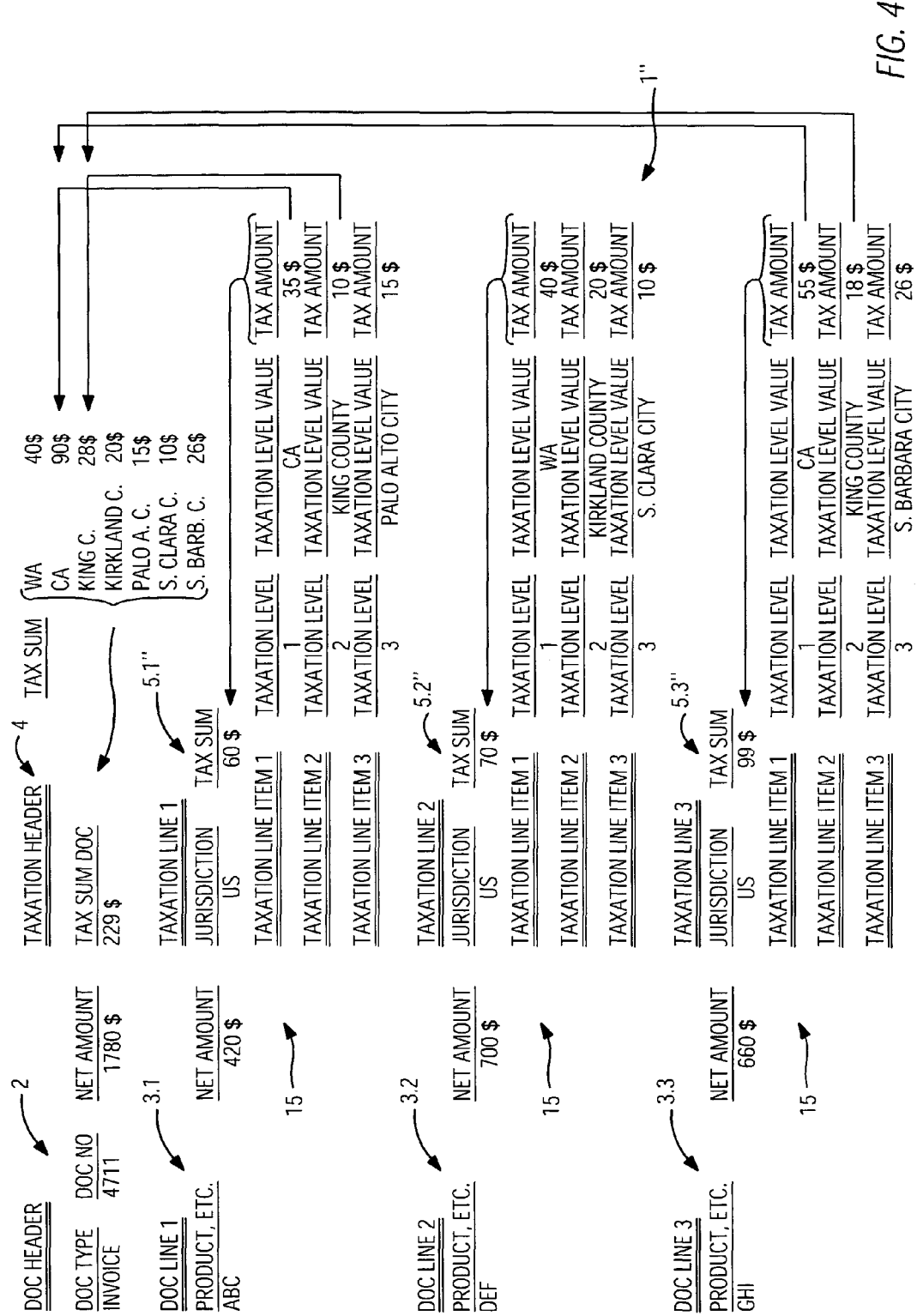
FIG. 4 illustrates the transaction document of FIG. 1 to which exemplary transaction-tax related data have been added on the basis of a data schema with taxation-line-item entities.

By contrast, FIG. 4 illustrates a preferred embodiment according to which transaction-tax related data are added to a transaction document on the basis of a data schema with further records on a hierarchy level below the taxation-line level—these lower-level records are called taxation-line-item records, or taxation-line-item entities. The different taxation levels which may occur in a taxation-line are modeled by these taxation-line-item entities in a more flexible manner. Before proceeding further with the detailed description of FIGS. 4 to 15, however, a few items of the embodiments shown in these figures will be discussed.

A general description of transaction-tax processing is set forth, for instance, in co-pending U.S. patent application Ser. No. 09/995,320 (Pub. No. U.S. 2003/0105687 A1), filed on Nov. 26, 2001 by Wolfgang Bross et al., U.S. National Stage Application of International Application No. PCT/EP01/13757 (Pub. No. WO 03/044664 A1), filed on Nov. 26, 2001 by Wolfgang Bross et al., and U.S. patent application Ser. No. 10/633,441, filed on Jul. 31, 2003 (U.S. Patent Publication No. 2005/0028174) in the names of Markus L. Rossmann, Wolfgang Bross et al., the disclosure of these documents is hereby incorporated by reference herein in its entirety.

According to the embodiments, a method is provided of making a data representation of transaction-tax-related information of a transaction in a database or data file which can be processed by a computer. According to what has already been explained above, the transaction is represented by a transaction document having one or more transaction-document lines; the transaction-tax-related information associated with the document lines has one or more taxation levels, for example different tax fragments for different regional authorities, such as state tax, county tax and city tax in the USA, or IVA, PERCEPCION, SURTAX and GIT in countries like Argentina. According to the embodiments, the data items representing the transaction-tax-related information are arranged in the database or data file according to a data schema for representing transaction-tax information for different jurisdictions. These jurisdictions may have different kinds and numbers of taxation levels. Different kinds of triple taxation levels have already been mentioned in connection with the USA and Argentina. Still other countries may have another number of taxation levels; for example, France has only one taxation level (TVA), and other countries may have two, four or a even greater number. The number of taxation levels need not be fixed; rather, certain taxation levels, although allowed in the data schema, may not occur in certain transaction instances (for example, if a buyer has a tax exemption for a certain taxation level).

The data schema of the embodiments provides a taxation-line entity for each transaction-document line. As already mentioned above, the taxation-line entity will normally be a separate entity associated with the document-line entity to which it refers, but it may also be in the form of attributes added to the transaction-document-line entity.

In contrast to the examples shown in FIGS. 2 and 3, the data schema of the embodiments provides a taxation-line-item entity type to store the taxation information. An entity of this type provided for each taxation level of a transaction-document line (and for each kind of tax on the same taxation level of a transaction-document line, if more than one kind occurs in a transaction-document line). The taxation level and kind is indicated by certain attribute values of a taxation-line-item entity, but not by its attribute structure, which is a standard structure equal for all taxation levels and kinds. This is in contrast to the data schema underlying FIGS. 2 and 3 according to which the different taxation levels that may occur are built into the document-line entity's attribute structure in a fixed manner.

In the embodiments, the taxation-line-item entities are of the same type for all taxation levels and jurisdictions. In other words, each taxation level and jurisdiction is modeled by one standard taxation-line-entity type and one standard taxation-line-item-entity type. These entity types are defined such that the taxation levels and jurisdictions on a global scale are modeled, i.e. all taxation levels in all jurisdictions all over the world can be represented. Which taxation levels and taxation-level values may occur in a certain jurisdiction and the meaning of the different taxation levels are defined by rules specific for the jurisdiction applied. For example, if a taxation-line entity indicates that "US" is the jurisdiction applied, a taxation-level value 1, 2 or 3 indicates that the corresponding taxation-line-item entity pertains to state tax, county tax or city tax, respectively.

In some of the embodiments, the above-mentioned jurisdiction-dependent rules include constraints on the taxation-line-item entities. Examples of such constraints are: (i) an existence constraint (non-null constraint) requiring that, for a certain jurisdiction applied, a taxation-line-item entity with a certain taxation level must be present (for example, when the French jurisdiction is applied a taxation-line-item entity with the taxation level corresponding to the French TVA must be present); (ii) a maximum-number constraint requiring that the number of taxation-line-item entities with a certain taxation level must not be greater than a predetermined number, for a certain jurisdiction applied (for example, the number of taxation-line-item entities with taxation levels 1, 2 and 3 must not be greater than one and the number of taxation-line-item entities with other taxation levels must not be greater than zero, when US jurisdiction is applied); (iii) a constraint on the kind of taxation levels, depending on the jurisdiction applied (the kind of taxation level is also called "taxation-level value" hereinafter), (for example, when U.S. jurisdiction is applied, for the taxation level 1, only taxation-level values are allowed which are an acronym of a U.S. state, such as CA and WA). In an exclusive-OR-constraint between different taxation levels; or kinds of taxation levels, such a constraint may preclude certain combinations of taxation levels or kinds of taxation levels in the taxation-line-item entities associated with the same taxation-line entity; (for example, when Argentine jurisdiction is applied, there is an exclusive-OR between the taxation-level values "PERCEPCION" and "SURTAX". Consequently, the taxation-line-item entities associated with one and the same taxation-line entity may have taxation-level values IVA/PERCEPCION/GIT and IVA/SURTAX/GIT, but combinations such as IVA/PERCEPCION/SURTAX are precluded). In a similar manner, OR and AND constraints between different taxation levels or kinds of taxation levels may be defined in the data schema.

The term "entity" is used herein in the meaning of the Entity-Relationship-Model used in the database technology (see, for example, Elmasri, pp. 41-51). An entity is the basic object in the Entity-Relationship-Model; usually it models a "thing" in the real world with an independent existence. In the present case, the taxation-line entities and the taxation-line-item entities model objects with a conceptual existence—a taxation line of a transaction document, and a taxation level associated with the taxation line. Each entity has attributes which are the particular properties that describe it. For example, the attributes of the taxation-line entity are the jurisdiction applied (for all taxation levels belonging to the taxation line) and the tax sum (of all taxation levels belonging to the taxation line), etc. The attributes of the taxation-line-item entity are, for example, taxation level, taxation-level value, transaction tax (for the corresponding taxation level), etc. There are relationships between different entities; for example, there is a relationship between the taxation-document-line-item entity and the taxation-line entity indication which line-item entity belongs to which line-entity.

In some of the embodiments, the data representation is stored in a relational database. In a relational database, the taxation-line entities of a document are tuples (also called records) of a taxation-line table, and taxation-line-item entities are tuples of a taxation-line-item table. Typically, each table corresponds to a file in the relational database system.

For use in distributed transaction-tax processing systems, a data representation of a transaction is needed which can easily be transmitted over a computer network and processed in a platform-independent and application-independent manner. In some embodiments, the data belonging to one transaction are stored together in one data file. In some of the embodiments, the data file is a file of tokenized data. A markup language is used to tokenize the data, such as SGML or XML (see XML specification: Extensible Markup Language) XML 1.0 (second edition) W3C Recommendation 6 Oct. 2003; HTTP://www.w3.org/TR/2000/REC-xml-20001006). A markup language such as XML uses a collection of tags to tag the data contained in the document and define the document's data structure. A hierarchical data structure may be defined by start and end tags: enclosing a tag between a start and the corresponding end tag defines a parent-child relationship. Thus, in the embodiments using an XML document to represent a transaction, the taxation-line-item entities associated with a taxation-line entity are taxation-line-item start and end tags enclosed by start and end tags of a taxation line.

Embodiments are described of a computer system for performing transaction-tax-related processing of transactions, wherein transaction documents of the kind described are produced, processed, stored and/or restored. In some of the embodiments, the computer system includes a logic interface between a calling application, one or more tax-calculation engines and a data warehouse, as described in the co-pending U.S. application Ser. No. 10/633,441 (U.S. Patent. Publication No. 2005/0028174). In some of the embodiments the calling application and/or the calculation engines use other data schemas to represent the transaction than the data schema described herein; in these embodiments, adapters are provided between the calling application and the logic interface and/or the calculation engines and the logic interface to translate data represented in another data schema into the data schema described herein, and vice versa. In other embodiments, both the calling application and the calculation engines use the data schema described herein as a standard schema; in these embodiments, no such adapters are needed.

A data representation of a transaction is a data product which can be exchanged (e.g. by exchanging a data carrier with data stored on it, or by transmitting the data product over a network) or archived. The data product may thus be commercialized without further hardware or software, as a "pure data file", for example by a tax-calculation service provider who receives transaction documents of the kind illustrated in FIG. 1, performs the transaction-tax processing and returns a transaction document, with tax-related data added, of the kind shown in FIG. 4. Therefore, some of the embodiments pertain to a machine-readable medium with data stored on it, wherein the data include a representation of a transaction document, as described herein. The "machine-readable medium" is any medium that is capable of storing or encoding data representing a transaction document. The term "machine-readable medium" shall accordingly be taken to include, for example solid state memories and removable and non-removable, optical and magnetic storage media.

A representation in the form of a propagated signal is an embodiment which enables the transaction document to be distributed over a network, such as the Internet or a private network. As with data in general, this is likely to become the usual way of transmitting such transaction documents. The signal is carried on an electromagnetic wave, i.e. a wire-guided wave transmitted over a copper cable, a radio wave transmitted through the air or a light wave transmitted through an optical fiber.

Returning now to FIG. 4, it shows an embodiment of a transaction document 1' which corresponds to the exemplary original transaction document 1 of FIG. 1 to which transaction-tax related data have been added. In contrast to FIG. 2, however, the taxation-level data are not stored as arguments of the taxation-line entities. Rather, as explained above, sub-entities are associated with the taxation-line entities 5.1", 5.2", 5.3", called taxation-line items 15 in FIG. 4. For each taxation level and taxation-level value associated with a taxation line, a separate taxation-level item 15 is provided. All taxation-level items 15 are of the same entity type, i.e. they have the same attribute structure; the attributes are designed such that they are able to model all transaction-tax-taxation levels of all countries throughout the world; the taxation-level-item entity type thus is a sort of generalized global taxation-level model.

Some of the attributes of the taxation-level item 15 are shown in FIG. 4, the taxation-level attribute, the taxation-level value attribute and the tax amount attribute. It depends on the jurisdiction applied which taxation levels and taxation-level values are allowed. The jurisdiction applied to a certain taxation line 5 is indicated in a jurisdiction attribute of the taxation-line entity 5". In the example shown in FIG. 4 the jurisdiction applied to all taxation lines is the U.S. jurisdiction, according to which three taxation levels are provided: the first taxation level relates to state tax, the second one to county tax and the third one to city tax. Consequently, each taxation line 5" has a taxation-line item 15 with a taxation level "1", the taxation value attribute of which indicates a state (such CA or WA). Furthermore, each taxation of which line 5" has a taxation-line item 15 with a taxation level "2", the taxation-level-value attribute indicates a county (for example, King County or Kirkland County). Finally, each taxation line 5" has a taxation-line item 15 with a taxation level "3", the taxation-level-value attribute of which indicates a city (such as Palo Alto City, Santa Clara City or Santa Barbara City). Besides the attributes shown in FIG. 4, the taxation-line-item entity 15 may have further attributes, such as an attribute indicating the taxable base, the tax rate, a tax-zone name, a tax-zone level, a reason code, a reduced base of ICMS (a Brasilian transaction tax), a difference rate and amount (for jurisdictions in which the transaction tax depends on the "added value" in an individual transaction), general ledger information, tax-exemption information, etc.

The transaction document 1" contains not only the individual tax amounts broken down to the level of the taxation-line items 15, but also three different kinds of tax sums. The first kind is the sum of the tax amounts of the individual taxation-line items 15 associated with a certain taxation line; it is an attribute of the taxation-line entity 5". The second kind is the sum of all tax amounts belonging to the same taxation-level values occurring in the whole transaction document 1"; these sums are part of the taxation header 4 (in the exemplary transaction document 1" of FIG. 4, the sums of all tax amounts for WA, CA, King County; Kirkland County; Palo Alto City, Santa Clara City and Santa Barbara City, are indicated, respectively). Finally, the third kind is the total sum of the latter values; this is also an attribute of the taxation header 4.

Figure 5:
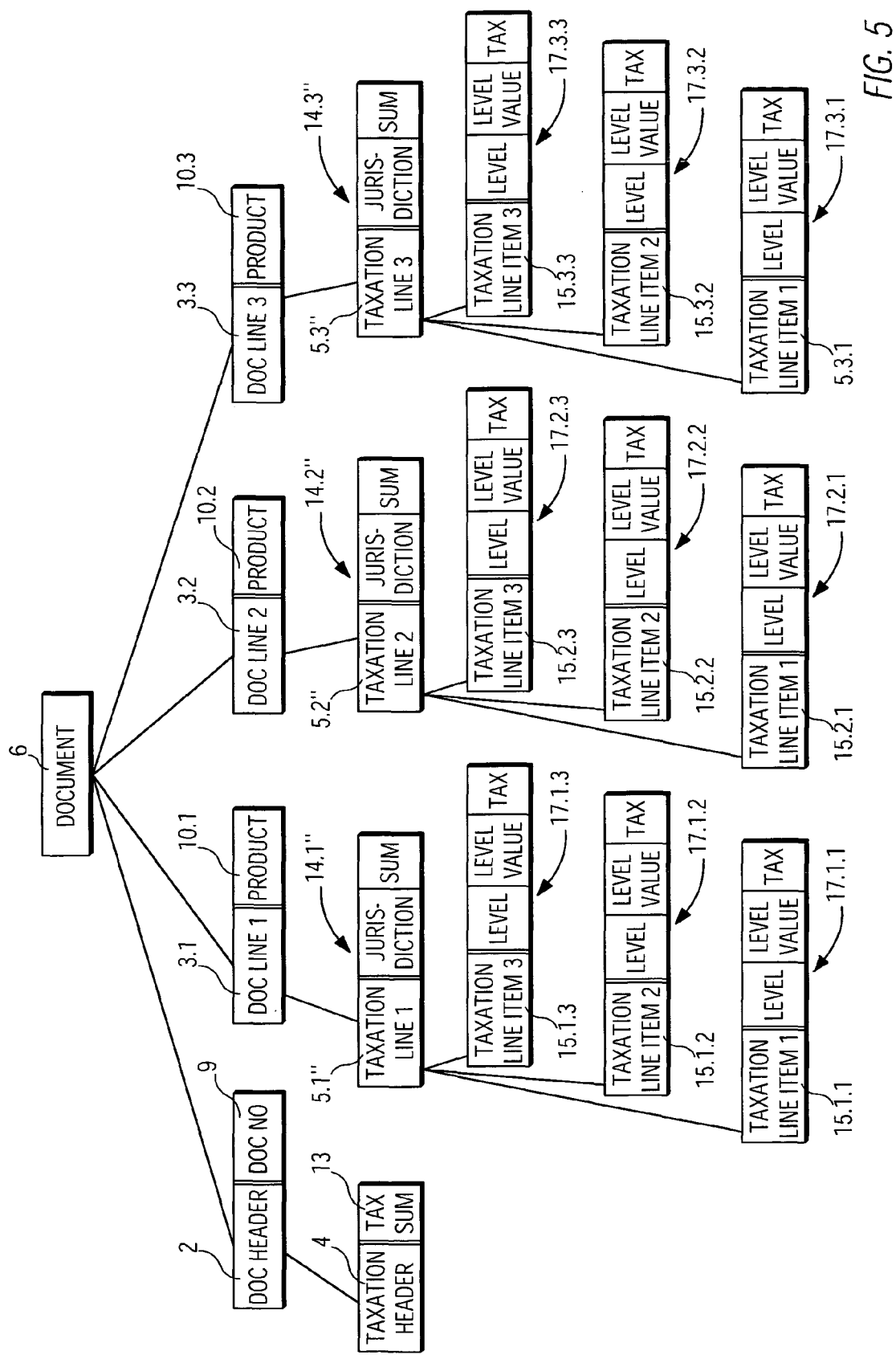
FIG. 5 is a hierarchical diagram illustrating a hierarchical data schema underlying the transaction document of FIG. 4.

FIG. 5 is a hierarchical diagram illustrating a hierarchical data schema underlying the transaction document of FIG. 4. The document-header record 2, the taxation-header record 4 and the document-line records 3 correspond to FIG. 3. However, on and below the level of the taxation-line records 5.1, 5.2, 5.3 the data schema differs from FIG. 3. The data items 14.1", 14.2", 14.3" of the taxation-line records 5.1", 5.2" 5.3" do not contain taxation-level-related data, as in FIG. 3. Rather, children are associated with each taxation-line record 5.1"; 5.2"; 5.3", called taxation-line-item records 15. Each of the taxation-line records 15 has data items 17 which contain data relating to only one taxation level and taxation-level value. Therefore, owing to the fact that, in the example of FIG. 5, each taxation line 5" involves three taxation levels, each taxation-line record 5" has three taxation-line-item records 15 as children. All the taxation-line item records 15 are of the same record type.

The data structure illustrated by the examples 4 and 5 is more flexible than that of FIGS. 2 and 3, and thus enables transaction-tax data of all jurisdictions to be represented in a simple way, standardized for all countries. This is illustrated by FIG. 6 which shows another exemplary transaction document 1" similar to FIG. 4, but with taxation-level data pertaining to a different jurisdiction, here Argentina, as indicated by the attribute values of the jurisdiction attribute of the taxation-line entities 5".

Figure 6:
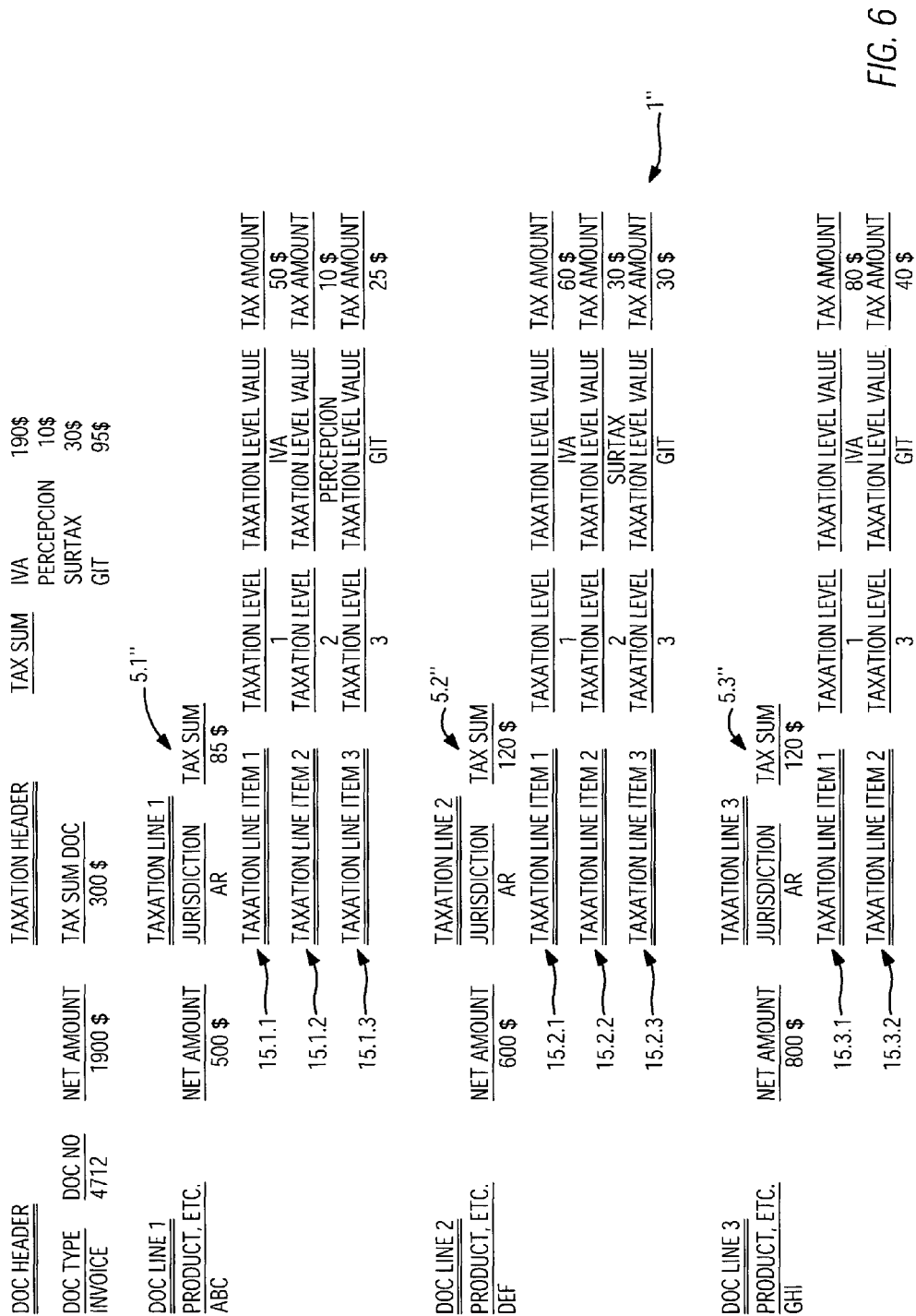
FIG. 6 illustrates another exemplary transaction document, similar to FIG. 4, but with transaction-tax data pertaining to a different jurisdiction.

As can be taken from FIG. 6, for the Argentine jurisdiction, the values of the taxation-level-value attribute are IVA, PERCEPCION, SURTAX and GIT, different from the values for U.S. jurisdiction shown in FIG. 4. In the flexible data structure underlying FIGS. 3-9, the different taxation-level values are attribute values that can be freely chosen, whereas in the data structure according to document of FIGS. 2 and 3 the different taxation-level values are "cast" in the attribute structure by fixed attribute types, an adaptation of which to different jurisdictions will generally require a re-casting of the attribute structure. FIG. 6 also shows that the number of taxation-line-items 15' depends on the number of taxation levels actually occurring in a certain taxation line of an instance document. For example, the third taxation line 5.3" has only two transaction-line items 15 whereas the other taxation lines 5.1", 5.2" have three taxation-line items 15 (this, for example may be due to the fact that for the third exemplary taxation line no percepcion or surtax is payable). This is in contrast to the data schema underlying FIGS. 2 and 3 according to which the number and kinds of taxation levels is fixed in the attribute structure of the taxation-line records. Incidentally, FIG. 6 also complies with the exclusive-OR constraint to the taxation-level values percepcion and surtax, since either PERCEPCION or SURTAX appears as a taxation-level value in the set of taxation-line items IS associated with a taxation line 5".

Figure 7:
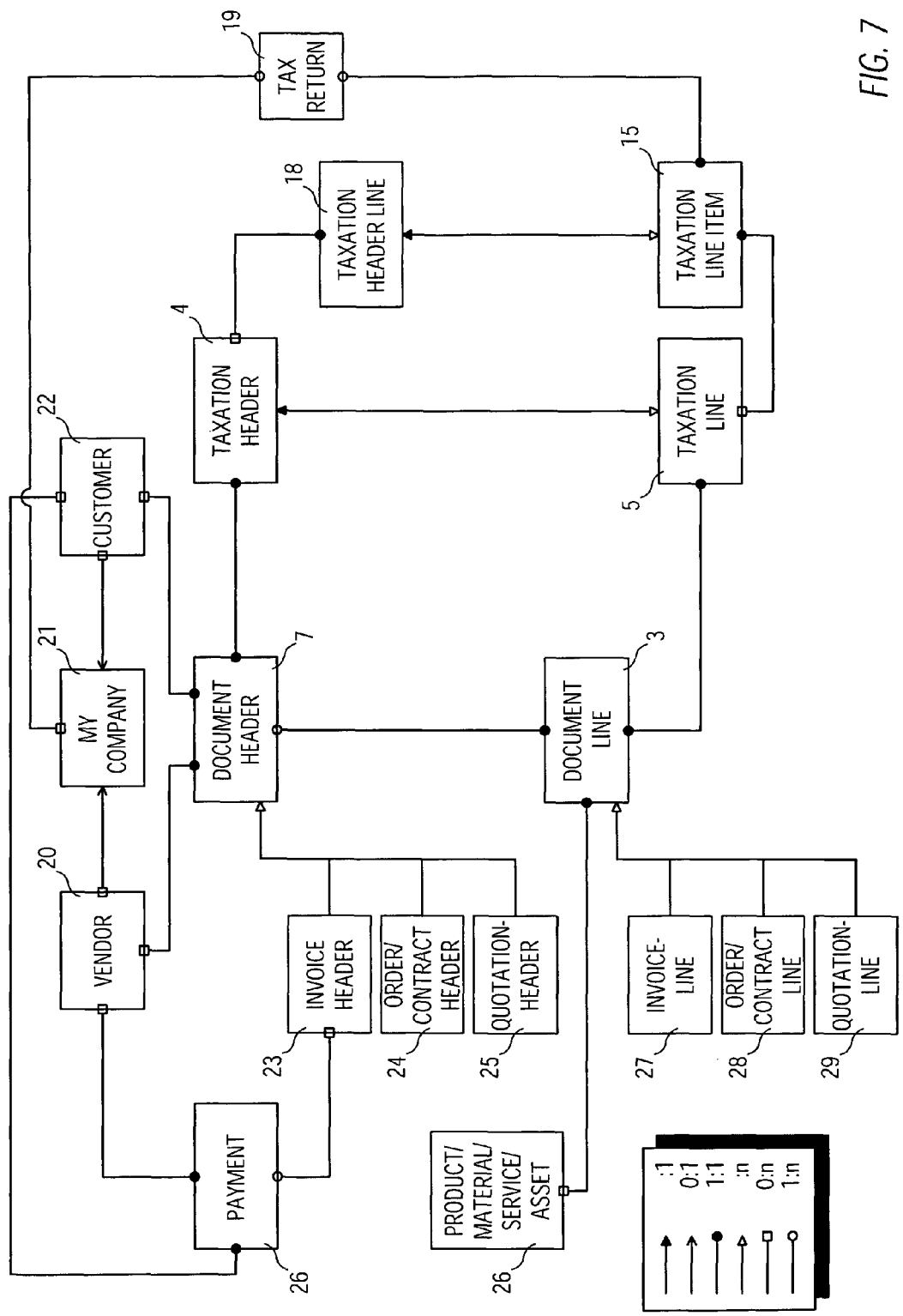
FIG. 7 is an entity-relationship diagram of the data schema underlying FIGS. 4 to 6.

FIG. 7 is an entity-relationship diagram of the data schema underlying the exemplary transaction documents illustrated in FIGS. 4 to 6. Entities are represented by boxes, and relationships by lines connecting boxes. Moreover, the relationships' min:max constraints are indicated in FIG. 7 by different symbols defined in a key to FIG. 7. For example, the relationship between taxation-line entity 5 and taxation-line-item entity 15 is a 0:n relationship (indicated by an open-square symbol) in the direction from the taxation-line entity 5 to the taxation-line-item entity 15, and a 1:1 relationship (indicated by a full circle) in the other direction. This means, for example, that zero to n taxation-line-item entities 15 may be associated with the taxation-line entity 5, and that each taxation-line-item entity 15 is associated with exactly one taxation-line entity 5.

The data schema of FIG. 7 includes document-related and tax-related entities which have already been discussed in connection with FIGS. 4 to 6: the document-header entity 7, the taxation-header entity 11, the document-line entity 3, the taxation-line entity 5 and the taxation-line-item entity 15. There are two further tax-related entities, a taxation-header-line entity 18 (already mentioned, too) and a tax-return entity 19.

Furthermore, the data schema includes a variety of other entities which are typically already included in an original transaction document, as the one shown in FIG. 1; these are entities which may contain information relevant for transaction tax processing, for example information from which a tax-calculation engine can infer the taxation levels, the taxation-level values and the tax amounts of the taxation-line-item entities associated with the document's taxation lines. Some of these further entities are on the document-header level, others are on the document-line level. A first group of entities on the document-header level relates to the transaction parties' identities and locations, such as a vendor entity 20, a my-company entity 21, and a customer entity 22. A second group of entities on the document-header level relates to the specific document type such as an invoice-header entity 23, an order/contract-header entity 24 and a quotation-header entity 25. A third entity on the document-header level is payment-related, a payment entity 26. On the document-line level, an entity relates to information characterizing the sub-transaction represented by a document line, for example, information specifying a product or material sold, or a service or asset provided. It is called product/material/service/asset entity 26. Furthermore, a group of entities on the document-line level relates to information specific for the different document types, an invoice-line entity 27, an order/contract-line entity 28 and a quotation-line entity 29.

The taxation-header-line entity 18 pertains to taxation-header-line information, for example, the tax sums of the document's different taxation-level values, an example of which is shown on the taxation-header level of FIG. 4. The tax-return entity 19 pertains to information indicating for which taxation-line-item entities the transaction tax has already been paid to the competent tax authority.

As may be taken from FIG. 7, the relationship between the document-header entity 7 and the document-line entity 3 is a 1:n relationship from the document-header entity 7 to the document-line entity 3 and a 1:1 relationship in the other direction. This means that at least one, but possibly n (a number bigger than one), document-line entities are associated with the document-header entity (in other words, each document has one or more document lines), and that each document-line entity is associated with the (single) document header entity.

The relationship between the document header entity 7 and the taxation-header entity 4 is a 1:1 relationship in both directions; i.e. a single taxation-header entity 4 is associated with the (single) document-header entity 7. Likewise, the relationship between the document-line entity 3 and the taxation-line entity 5 is a 1:1 relationship in both directions, i.e. there is a single taxation-line entity 5 associated with each document-line entity 3. The relationship between the taxation-header entity 4 and the taxation-header-line entity 18 is a 0:n relationship from the taxation-header entity 4 to the taxation-header-line entity 18 and a 1:1 relationship in the other direction. This means that there may be no, one or more than one taxation-header-line entities 18 associated with the taxation-header entity 4, and that each taxation-header-line entity 18 is associated with the (single) taxation-header entity 4. Likewise, the relation between the taxation-line entity 5 and the taxation-line-item entity 15 is 0:n relationship from the taxation-line entity 5 to the taxation-line-item entity 15 and a 1:1 relationship in the other direction. This means that a taxation-line entity 5 may have no, one or more than one taxation-line-item entities 15 associated with it, and that each taxation-line-item entity 15 is associated with exactly one taxation-line entity 5. The fact that a taxation-line-item entity 15 is not mandatory for each taxation line 5 (and analogously, that a taxation-header-line entity 3 is not mandatory in the document) enables the data schema to also model documents which have not yet been transaction-tax processed, i.e. the taxation levels, taxation-level values, and transaction-tax amounts of which have not been calculated. In other embodiments, however, there are 1:n relationships from the taxation-header entity 11 to the taxation-header-line entity 18 and from the taxation-line entity 5 to the taxation-line-item entity 15; still other embodiments have 0:1 relationships from the document-header entity 7 to the taxation-header entity 4 and from the document-line entity 3 to the taxation-line entity 5.

Figure 8:
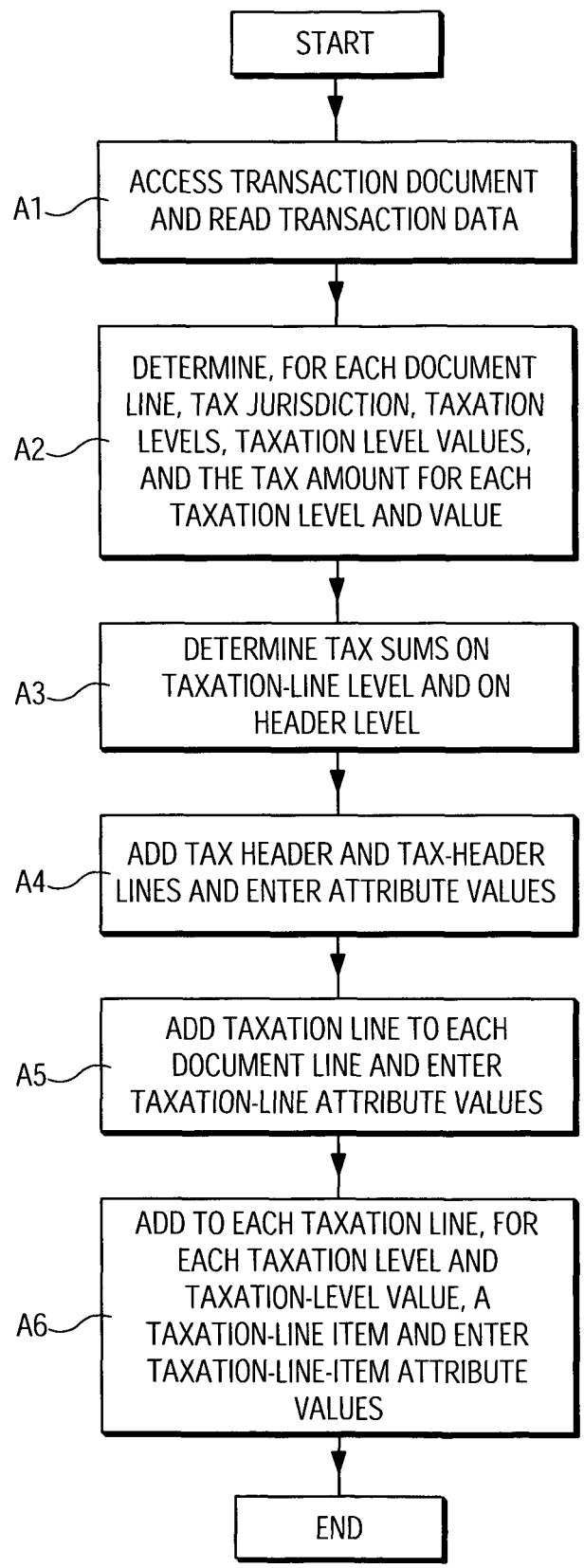
FIG. 8 is a flow diagram illustrating a method of making a data representation of FIGS. 4 to 7.

FIG. 8 is a flow diagram illustrating a method of making a data representation of the kind shown in FIGS. 4 to 7. The method may, for example, be carried out by a tax-calculation engine.

At A1, a transaction document (for example of the kind shown in FIG. 1) is accessed and the transaction data contained in it are read. At A2, the tax jurisdiction applied, the taxation levels, the taxation-level values and the transaction-tax amount for each taxation level and value are determined for each document line. At A3, tax sums are determined on the level of the individual taxation lines (i.e. the tax sum of the different taxation-level taxes for each taxation line is determined), as well as tax sums on the header level (i.e. the sums of all amounts belonging to the same taxation-level values (and the total sum of all tax amounts) are determined. At A4, the tax header and tax-header lines are added to the transaction document and the corresponding attribute values, determined at A3 are entered. At A5, a taxation line is added to each document line and the taxation-line attribute values, determined at A2 and A3, are entered. Finally, at A6, one taxation-line item is added for each taxation level included in a taxation line, and the taxation-level-related attributes (determined at A2) are entered into the taxation-line item attribute values, such as the taxation level, the taxation-level value, the tax value associated with the taxation level represented by the document-line item considered, etc. Naturally, the sequence described of A4, A5 and A6 is only exemplary; any other sequence of A4, A5 and A6 could also be chosen. Likewise A4, A5, A6 may be carried out at an earlier stage, and the attribute values mentioned may be entered as soon as they are known.

If the method is performed by an interface which translates an already complete transaction document from a different data representation into the representation of FIGS. 4 to 7, the method is slightly modified: at A1, the transaction document accessed is the source-transaction document in the different representation, and the transaction data are read from this source document. At A2 and A3, determining the data items mentioned may just mean reading these data items from the source document, if they are already available in the source document. Before A4, the output document (i.e. the document in the representation described in FIGS. 4 to 7) is created. At A4, the tax header and tax-header lines are added to the newly created output document. The "adding activities" at A5 and A6 also refer to the output document.

Figure 9:
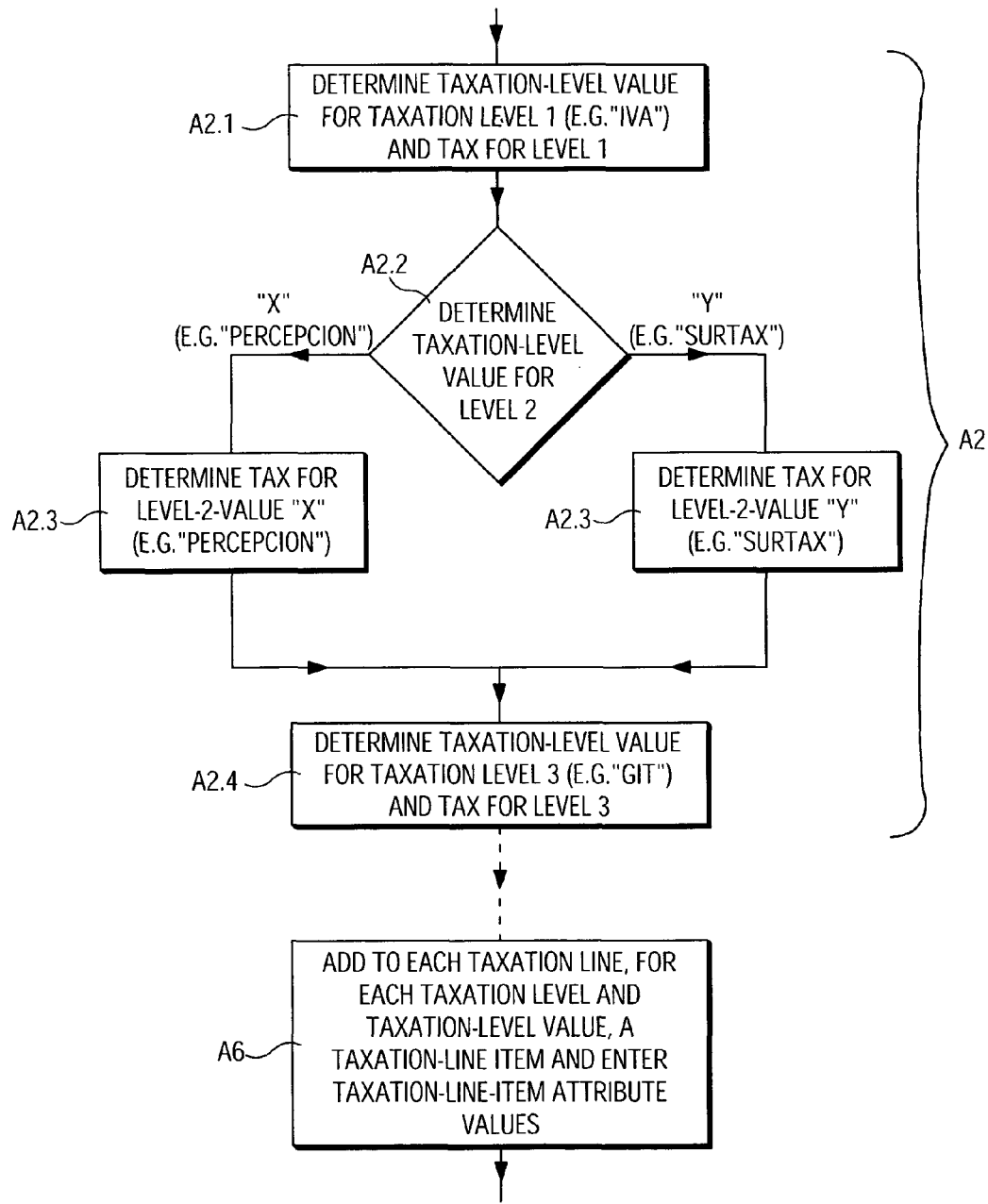
FIG. 9 is a flow diagram illustrating a constraint to taxation-line entities.
Figure 10G:
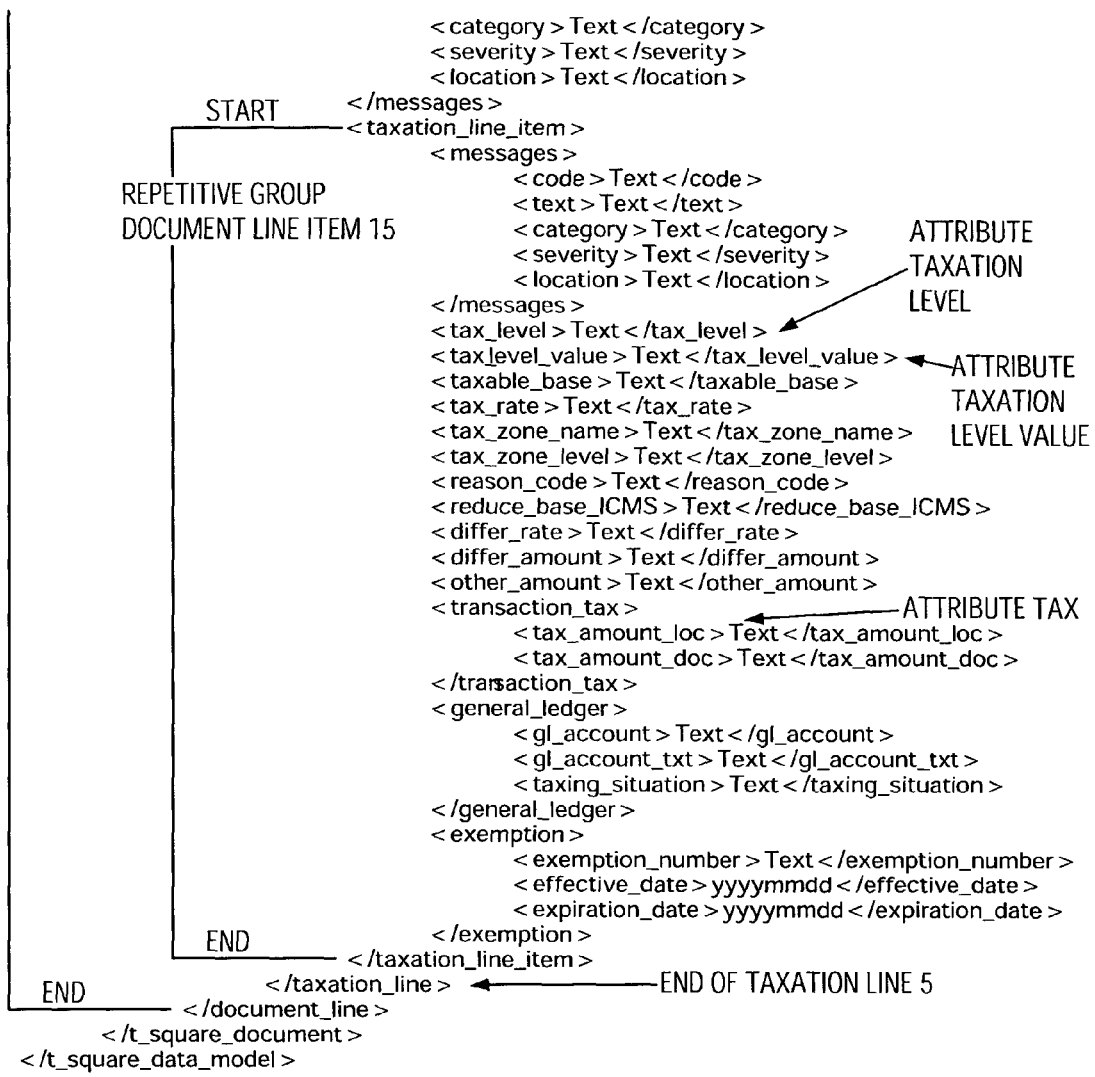

As shown in FIGS. 4 and 6, more than one taxation-level value may be allowed in a certain taxation level for a certain jurisdiction. For example, in the USA, the allowed level-1 values are the states of the USA; according to Argentine jurisdiction, the level-2 tax may be "PERCEPCION" and "SURTAX". The data schema may include constraints to the combinations of taxation-levels and taxation-level values associated with a taxation line. The flow diagram of FIG. 9 illustrates an exemplary constraint, an exclusive-OR constraint to a certain combination of taxation-level values. The activities A2.1 to A2.4 shown in FIG. 9 may be considered as sub-activities of A2 in FIG. 8.

At A2.1, the taxation-level value for taxation level 1 and the tax for this level are determined; assuming that, for the taxation line considered, Argentine jurisdiction is applied, an exemplary taxation-level value could be "IVA". At A2.2, the taxation-level value for level 2 is determined. In the example of FIG. 9, there are two admissible outcomes, "X" (here "PERCEPCION") and "Y" (here: "SURTAX"). If the determined taxation-level value is "X", at A2.3 the tax for the level 2-value "X" (e.g. for "PERCEPCION) is determined. If, however, the taxation-level value determined in A2.2 is "Y", then the tax for "Y" (e.g. for "SURTAX") is determined at A2.3. Thereby, an exclusive-OR constraint is realized between the level-2 values "X" and "Y". At A2.4, the taxation-level value for taxation level 3 and the tax for this level are determined; for example, the taxation-level value determined is "GIT". As in FIG. 8, at A6 a taxation-line item is added to each taxation line and each occurring taxation-level value and the corresponding taxation-line-item attribute values are entered. Due to the exclusive-OR constraint explained, a taxation line cannot contain taxation-line items with both "PERCEPCION" and "SURTAX". In other embodiments, a logical OR or a logical AND is implemented instead of the exclusive-OR of FIG. 9. In the case of a logical OR, the combinations X, Y as well as X and Y are permitted; in the case of a logical AND the combination X and Y only is permitted.

FIGS. 10a-10g is another representation of the schema shown in FIGS. 5 and 7, an XML representation. Not all entities of FIG. 7 are included in the XML representation of FIGS. 10a-10g, and, vice versa, certain entities of FIGS. 10a-10g are not shown in FIG. 7. As already explained above, in an XML representation tags are used to tag data (i.e. to indicate which attribute a data item represents) and to define a hierarchical document structure. Anything enclosed by a start tag and the corresponding end tag is either a data item tagged by the enclosing start and end tags, or a child entity, the parent entity of which is represented by the enclosing start and end tags (the child entity may have grand-children enclosed by the child's start and end tags, etc).

In FIGS. 10a-10g, the start and end tags defining the document-header 7 and certain sub-entities of the document-header 7 are indicated, in particular the taxation header 4. The taxation-header 4 has a sub-entity, the taxation-header line, which forms a repetitive group. A "repetitive group" is a group of tags which may appear several times in an instance XML document, depending on the specific contents of the instance document.

The document-header 7 is followed by a repetitive group, the document line 3. For example, in an instance of a document corresponding to FIG. 4, this repetitive group occurs three times in the XML document to represent the three document lines of FIG. 4. Another repetitive group is nested in the document line 3, the taxation line 15. For example, to represent the document shown in FIG. 4, the inner group defined by the taxation-line-item's start and end tags occurs three times between the start and end tags of the each of the three outer document lines 3.

To show an instance of the XML data schema of FIGS. 10a-10g, FIGS. 11a-11c shows the exemplary transaction document of FIG. 6 in the form of an XML document, as defined in FIGS. 10a-10g. Only those tags are reproduced in FIGS. 11a-11c which have a corresponding entity or attribute in FIG. 6, in order not to obscure the analogy to the representation of FIG. 6 and the XML document's repetitive structure.

Figure 11A:
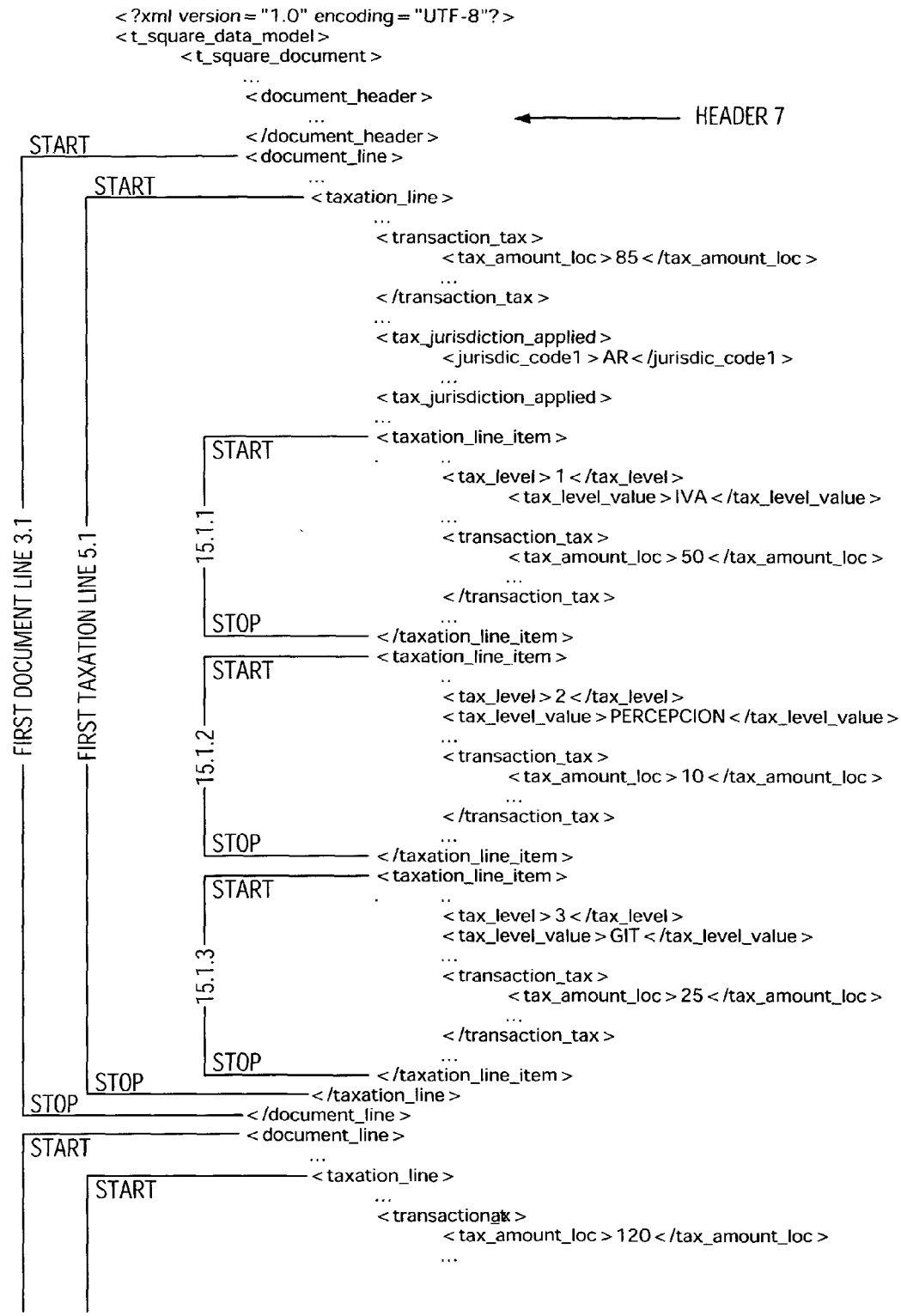
FIGS. 11a-11c illustrate an instance of FIG. 10a-10g, the exemplary document of FIG. 6 in the form of an XML document.
Figure 11B:
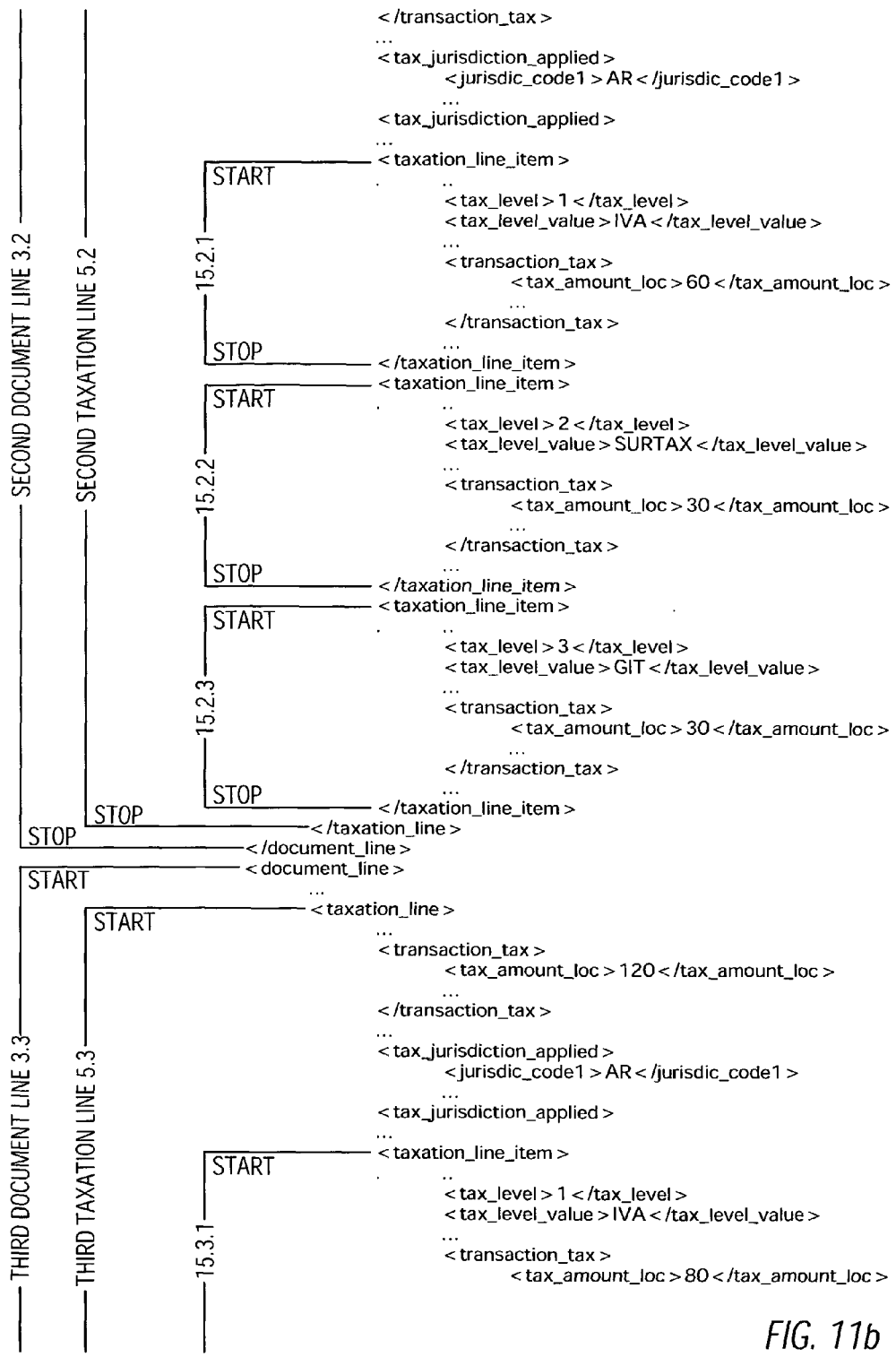
Figure 11C:
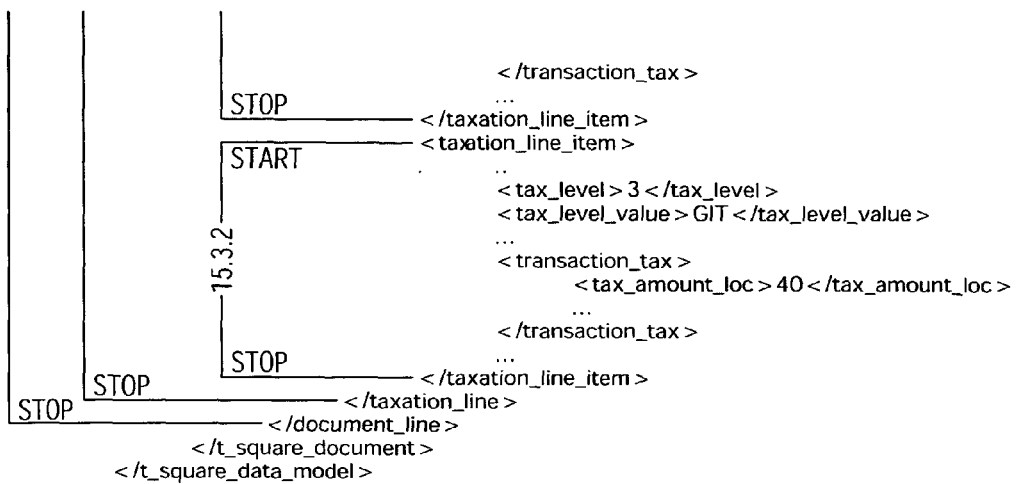

As can be seen in FIGS. 11a-11c, three document lines 3.1, 3.2 and 3.3 are represented by three successive document-line groups, each defined by a pair of document-line start and end tags. A taxation line 5.1, 5.2, 5.3, defined by a pair of taxation-lines start and end tags, is nested into each of the document lines 3.1, 3.2, 3.3. This indicates a 1:1 parent-child relationship between the document and taxation lines. Variable number of taxation-line items 15 is nested into each taxation line 5, which represents a 0:n (or 1:n) parent-child relationship between taxation line 5 and taxation-line items 15. A number of taxation-line items 15 in the first and second taxation lines 5.1 and 5.2 is three, in the third taxation line 5.2 it is two, in concordance with the instance in FIG. 6. The taxation-line-item start and end tags enclose data tags for tagging data items representing the tax level, tax-level value, tax amount etc. as can be seen from FIGS. 10a-10g and 11a-11c, the data structure, here in the form of a tag structure, accommodates taxation-level-related information in a flexible manner.

FIG. 12 is relational representation of the exemplary transaction-document 1" of FIG. 6 (without the document-header and taxation-header entities of FIG. 6). Such a relational representation is used to store the information contained in a transaction document in a relational data base. The relational representation of FIG. 12 has three relations to represent the line-related and line-item-related information, a Document line relation 3, a Taxation line relation 5, and a Taxation line item relation 15. As shown in FIG. 12, a relation can be thought of as a table of values. Each row of the table, also called a tuple, represents a specific entity, including the entity's relationship to other entities. The column names specify how to interpret the data values in each row, they are thus the entities' attributes and, the data values specified in the columns are the attribute values.

As already mentioned, some of the attributes represent the relationships between the relations. For example, the attribute DOCUMENT LINE NO defines with which tuple of the Document line relation 3 a tuple of the Taxation line relation 5 is associated. Likewise, the TAXATION LINE NO attribute of the Taxation line item relation 15 defines with which tuple of the Taxation line relation 5 a tuple of the Taxation line item relation 15 is associated. (Naturally, the document line relation 3 will also have an attribute defining with which document the document line relation 3 is associated). The remaining attributes shown in FIG. 12 store the document line, taxation line and taxation line-item related data shown in the exemplary transaction document of FIG. 6.

As can be seen from FIG. 12, the taxation-level-related information is not stored in an attribute of a relation on the document-line or taxation-line level, but rather in a separate relation, the Taxation-line-item relation 15. Each taxation level or taxation-level value occurring in a document is represented by its own by a tuple of this separate relation. This structure enables global taxation-level information to be modeled in a flexible manner.

In a relational database system, each table 3, 5, 15 is stored as a file. In some embodiments, data representing more than one transaction document are commonly stored in a file. In such embodiments, the tables 3, 5 and 15 have an additional attribute specifying the document to which they are associated, for example a document number attribute.

The XML representation of FIGS. 11a-11c and the relational representation of FIG. 12 can be transformed into each other. The XML representation will typically be used when transaction documents are transmitted over a network, e.g. as an argument of a remote procedure call to a tax-calculation engine or as an argument of a response to such a call, from the tax-calculation engine. A relational representation shown in FIG. 12 will typically be used when transaction documents are stored in databases.

Figure 13:
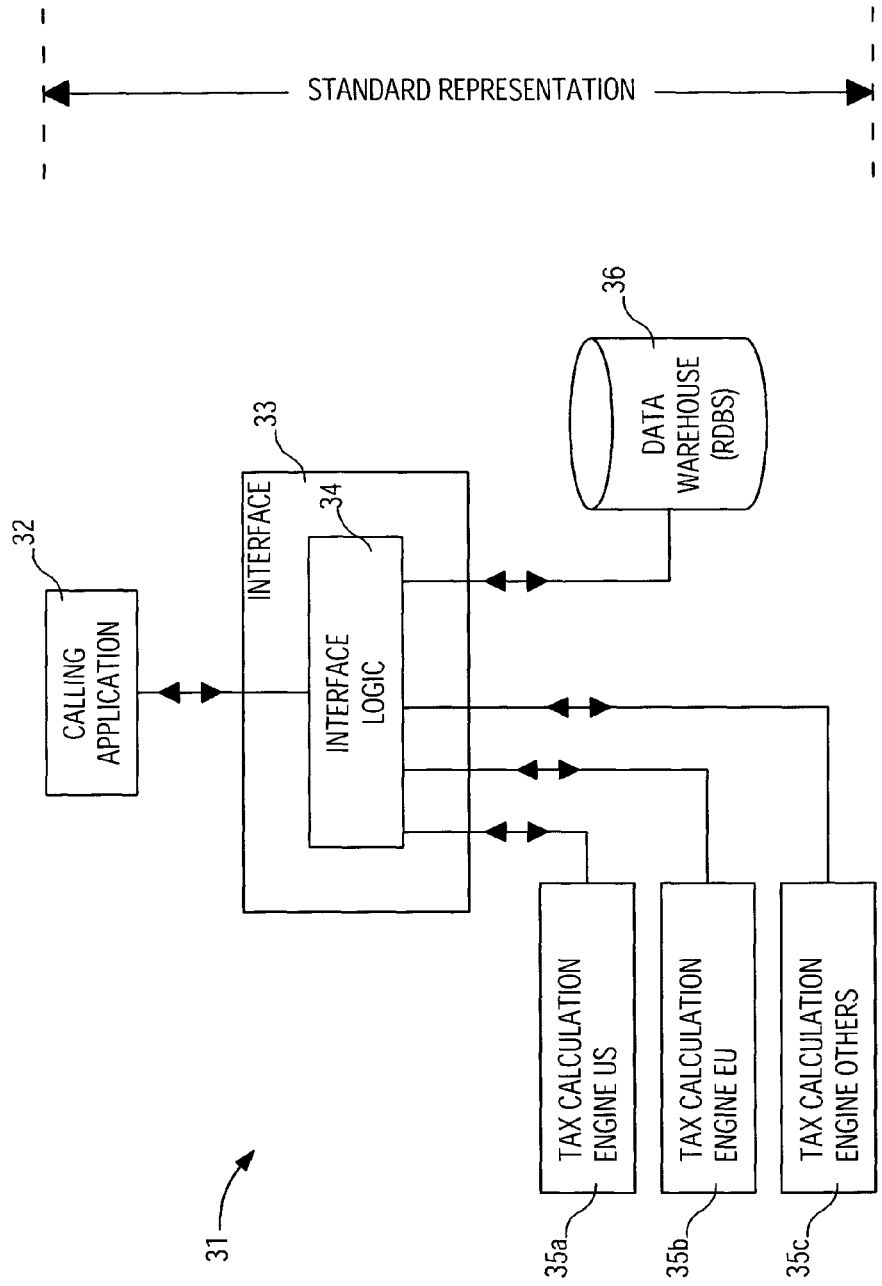
FIG. 13. is a high level-diagram of a transaction tax processing system.

FIG. 13 is a high level-diagram of a transaction-tax-processing system 31. The system 31 includes different components: a calling application 32, an interface 33 with an interface logic 34, one or more tax-calculation engines 35, and a data warehouse 36. The calling application may, for example, be an enterprise resource planning application (e.g. SAP R/3) arranged to send transaction-tax-calculation requests together with transaction data, e.g. in the form of a transaction document, as shown in FIG. 1, to the interface 33. The interface 33 is arranged to receive such requests. Its interface logic 34 is able to analyze the request and, depending on the nature of the request and the transaction data associated with it, to forward it to the tax-calculation engine 35 or the data warehouse 36. The selection of the tax-calculation engine 35, may, for example, depend on the jurisdiction to be applied to a particular transaction, provided that the different tax-calculation engines 35 are specialized in different jurisdictions. When the requested tax-calculation engine 35 has finished the request, it returns a response to the interface 33, together with the transaction document, now completed by the tax-calculation results, for example, a document of the kind shown in FIGS. 4 and 6. The interface logic 34 forwards the response to the calling application 32 and/or the data warehouse 36 to have the transaction document stored. The data warehouse 36 is for example, a relational database system (ROBS), including a relational database management system and a relational database. The data warehouse 36 of a document (FIG. 11) into a relational representation to be stored (FIG. 12), and vice versa.

In the embodiment shown in FIG. 13, all components 32-36 of the computer system 31 use a representation of the transaction document as described in FIGS. 4 to 12 called "standard representation". Therefore, in a distributed system in which the calling application 32, the interface 33, the tax calculation engines 35 and the data warehouse 36 are hosted on different computers, each of these components shown can be thought of as a computer for performing transaction-tax-related processing of transactions, programmed to input, output, modify or store a transaction document in the standard representation. It is likewise possible to host some or all of the components 32 on the same computer, which can then be considered as the computer programmed to input, output, modify and/or store such a transaction document in the standard representation.

Figure 14:
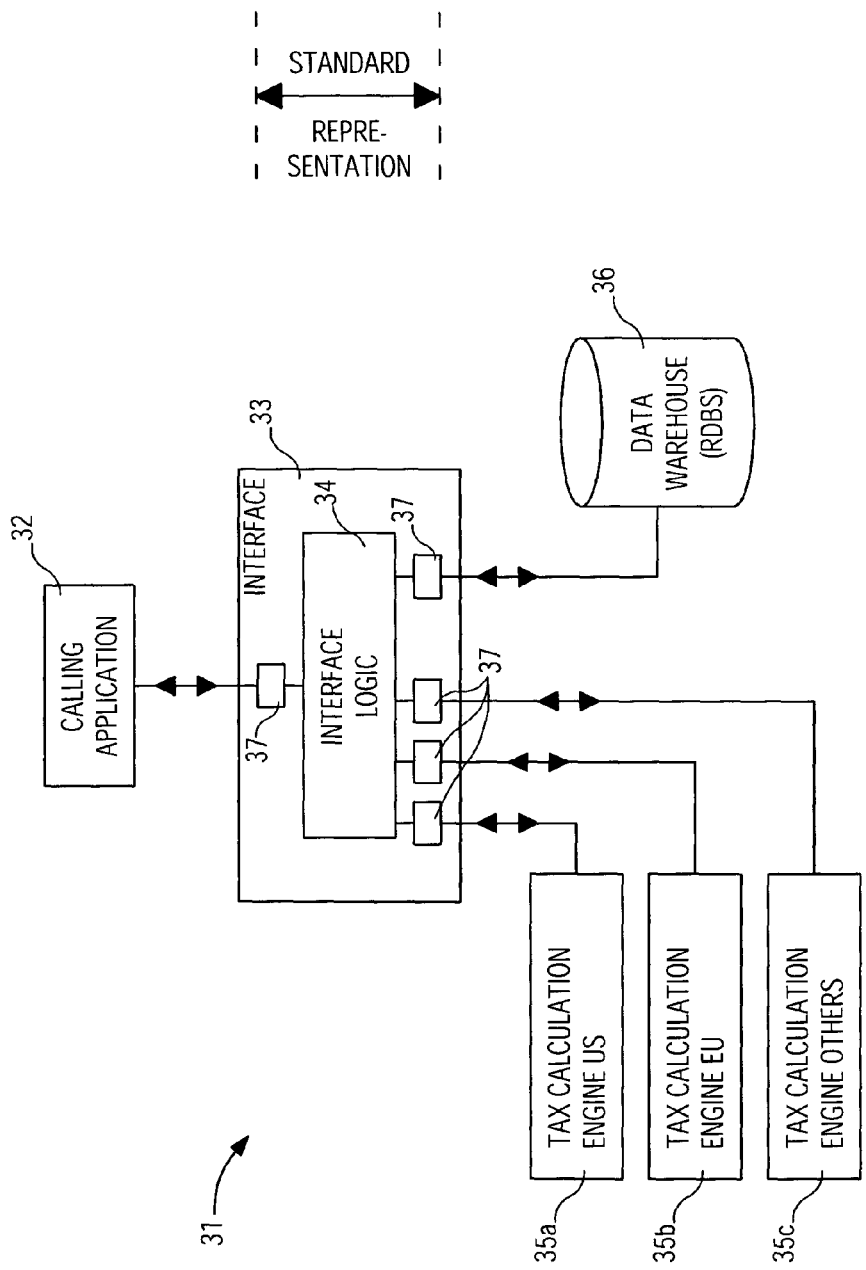
FIG. 14 is another embodiment which is similar to FIG. 15, but has adapters to translate other representations into the representation of FIG. 4 to 12.

In another embodiment, illustrated in FIG. 14, the calling application 32, the tax calculation engines 35 and the data warehouse 36 use a different data representation or representations, for example, a representation of the kind shown in FIGS. 2 and 3. Only the interface logic 34 uses the standard representation. Adapters 37 are provided between the interface logic 34 and the other components 32, 35, 36 to translate transaction documents represented in the other data representations into the standard data representation, and vice versa. The adapters 37 may be hosted on the same computer as the interface logic 34, or on different computers. The interface logic 33 and the adapter 37, either per se or in combination, may be thought of as a computer programmed to input or output a transaction document in the standard representation.

Still other embodiments are "mixed-representation" embodiments: some of the components 32, 35, 36 connectable with the interface 33 use the standard representation, others use a different representation, or representations. For example, in one embodiment the transaction-data are stored in the data warehouse 36 in the standard representation, whereas the calling application 32 and the tax calculation engines 35 use another representation. In a still other embodiment a group of tax calculation engines 35 with "mixed-representation" is used: some of the tax calculation engines 35 (for example the engine 35a) use the standard format of FIGS. 4 to 12, whereas the other tax calculation engines (for example 35b and 35c) use another data representation.

Figure 15:
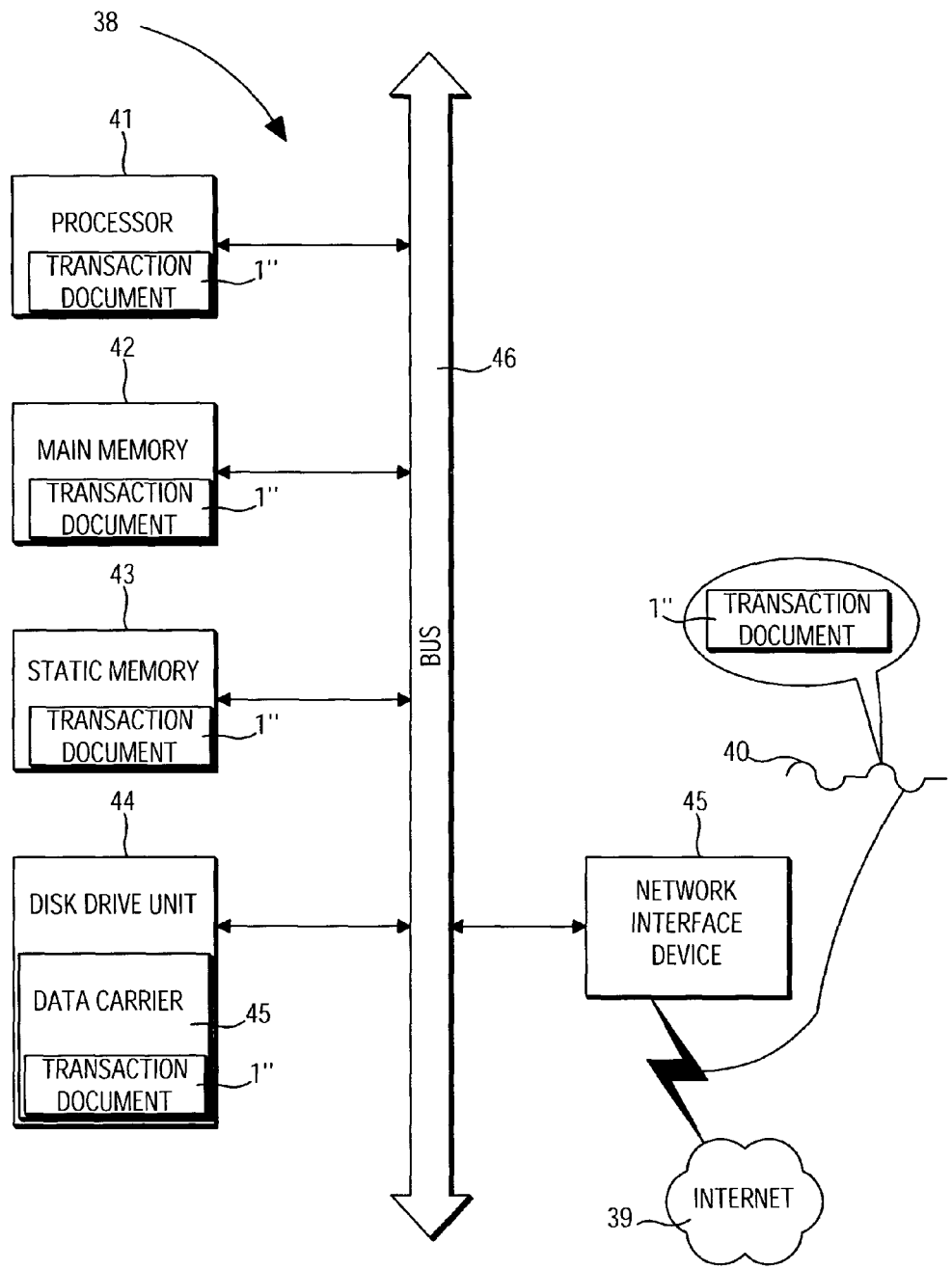
FIG. 15 is a high-level architecture diagram of a computer with document data stored on machine-readable media.

FIG. 15 is a high-level-architecture diagram of a computer 38, which may host the calling application 32, the interface logic 34, the data warehouse 36, or an adapter 37, shown in FIGS. 13 and 14, or a combination of some of, or all, these components. FIG. 15 also shows several different machine-readable media with a transaction-document 1" in the standard representation described in FIGS. 4 to 12. Moreover, it also illustrates that a transaction document 1" in the standard representation is transmitted to or from the computer 38 via a network, e.g. the Internet 39, in the form of a propagated signal 40 transmitted over the network. The computer 38 includes a processor 41 and memory, such as a main memory 42, a static memory 43 and/or a disc drive unit 44, as well as a network interface device 45, which communicate with each other via a bus 46. One or more transaction documents 1" in the standard representation may be stored in or on a machine-readable medium, e.g. the processor 41, the main memory 42 the static memory 43 and/or a data carrier 47 (e.g. a magnetic or optical disc, which may be removable or non-removable) which is part of the disc drive unit 44. The transaction document 1" in the standard representation may further be transmitted or received as a propagated signal 40 via the Internet 39 through the network interface device 45.

Thus, a general purpose of the disclosed embodiments is to provide methods and products to enable global transaction-tax information to be modeled in a flexible way. For example, legal changes pertaining to tax levels and tax-level values can be reproduced in the disclosed data representation without changes to attribute structures.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of making a data representation of transaction-tax-related information of a transaction, the transaction being represented by a transaction document having transaction-document lines, the transaction-tax-related information having one or more taxation levels, the method comprising:
arranging, by a computer, data items representing the transaction-tax-related information according to a data schema for representing transaction-tax related information for different jurisdictions, including jurisdictions with different kinds and numbers of taxation levels;
wherein the data schema provides a taxation-line entity for each of the transaction-document lines of the transaction document, wherein the transaction-document lines correspond to respective sub-transactions of the transaction;
the data schema provides a taxation-line-item entity, related to the taxation-line entity, for each taxation level of a corresponding transaction-document line, wherein plural taxation-line-item entities are provided for the corresponding transaction-document line associated with plural taxation levels; and
wherein an attribute of each taxation-line-item entity is used to indicate the taxation level represented by the taxation-line-item entity.

2. The method of claim 1, wherein the taxation-line-item entities are of the same entity type for all taxation levels and jurisdictions.

3. The method of claim 1, wherein the data schema includes one or more jurisdiction-dependent constraints on the taxation-line-item entities associated with a taxation-line entity.

4. The method of claim 3, wherein the one or more jurisdiction-dependent constraints include at least one of a non-null constraint, a maximum-number constraint, a constraint on the kind of taxation level, an exclusive-OR constraint between different taxation levels or kinds of taxation levels, and an AND constraint between different taxation levels or kinds of taxation levels.

5. The method of claim 1, further comprising providing the transaction-tax-related information in a data file, wherein the data file is a file of tokenized data.

6. The method of claim 5, wherein XML, SGML, or another markup language is used to tokenize the data.

7. The method of claim 1, further comprising storing the data representation in a relational database, wherein the taxation-line entities and the taxation-line-item entities are tuples of taxation-line relations and taxation-line-item relations of the relational database.

8. A computer for performing transaction-tax-related processing of a transaction, the computer being programmed to input, output or modify a transaction document having transaction-document lines with which one or more taxation levels are associated; the computer comprising:
a processor to receive the transaction document and to perform the transaction-tax-related processing in response to the transaction document, wherein the transaction document includes data items representing transaction-tax-related information according to a data schema for representing transaction-tax-related information for different jurisdictions, including jurisdictions with different kinds and numbers of taxation levels;
wherein the data schema provides a taxation-line entity for each of the transaction-document lines of the transaction document, wherein the transaction-document lines correspond to respective sub-transactions of the transaction;
the data schema provides a taxation-line-item entity, related to the taxation-line entity, for each taxation level of a corresponding transaction-document line, wherein plural taxation-line-item entities are provided for the corresponding transaction-document line associated with plural taxation levels; and
wherein an attribute of each taxation-line-item entity is used to indicate the taxation level represented by the taxation-line-item entity.

9. The computer of claim 8, wherein the taxation-line-item entities are of the same entity type for all taxation levels and jurisdictions.

10. The computer of claim 8, wherein the data schema includes one or more jurisdiction-dependent constraints on the taxation-line-item entities associated with a taxation-line entity.

11. The computer of claim 10, wherein the one or more jurisdiction-dependent constraints include at least one of a non-null constraint, a maximum-number constraint, a constraint on the kind of taxation level, an exclusive-OR constraint between different taxation levels or kinds of taxation levels, and an AND constraint between different taxation levels or kinds of taxation levels.

12. The computer of claim 8, wherein the processor is to provide the transaction-tax-related information in a data file, and wherein the data file is a file of tokenized data.

13. The computer of claim 12, wherein the data is tokenized by XML, SGML, or another markup language.

14. The computer of claim 8, wherein the transaction-tax-related information is stored in a relational database, wherein the taxation-line entities and the taxation-line-item entities are relations of the relational database.

15. A non-transitory machine-readable medium containing a program that when executed by a computer causes the computer to:
receive a transaction document having plural document lines, wherein the transaction document is associated with a transaction, and wherein the document lines correspond to sub-transactions of the transactions; and
produce transaction-tax-related information according to a data schema for representing transaction-tax-related information for different jurisdictions, including jurisdictions with different kinds and numbers of taxation levels;

the data schema providing a taxation-line entity for each of the document lines;

the data schema providing a taxation-line-item entity, related to the taxation-line entity, for each taxation level of a corresponding document line, wherein plural transaction-line-item entities are provided for the corresponding document line associated with plural taxation levels;

wherein an attribute of each taxation-line-item entity indicates the taxation level represented by the taxation-line-item entity.

16. The medium of claim 15, wherein the taxation-line-item entities are of the same entity type for all taxation levels and jurisdictions.

17. The medium of claim 15, wherein the data schema includes one or more jurisdiction-dependent constraints on the taxation-line-item entities associated with a taxation-line entity.

18. The medium of claim 17, wherein the one or more jurisdiction-dependent constraints include at least one of a non-null constraint, a maximum-number constraint, a constraint on the kind of taxation level, an exclusive-OR constraint between different taxation levels or kinds of taxation levels, and an AND constraint between different taxation levels or kinds of taxation levels.

19. The medium of claim 15, wherein the transaction-tax-related information is provided in a data file, and wherein the data file is a file of tokenized data.

20. The medium of claim 19, wherein the data is tokenized by XML, SGML, or another markup language.

21. The method of claim 1, wherein the data schema is a hierarchical data schema having plural levels including a taxation-line level that provides the taxation-line entity, and a taxation-line-item level, below the taxation-line level, that provides the taxation-line-item entities.

22. The method of claim 1, further comprising:
reading transaction data in the transaction document;
determining a tax jurisdiction and taxation levels of the determined tax jurisdiction;
for each of the transaction-document lines in the transaction document, adding a taxation line according to the taxation-line entity to the transaction document;
for each taxation line, adding plural taxation-line items for corresponding taxation levels of the determined tax jurisdiction to the transaction document.

23. The method of claim 1, further comprising:
reading transaction data in the transaction document;
determining a tax jurisdiction and taxation levels of the determined tax jurisdiction;
for each of the transaction-document lines in the transaction document, adding a taxation line according to the taxation-line entity to an output document; and
for each taxation line, adding plural taxation-line items for corresponding taxation levels of the determined tax jurisdiction to the output document.

24. The computer of claim 8, wherein the data schema is a hierarchical data schema having plural levels including a taxation-line level that provides the taxation-line entity, and a taxation-line-item level, below the taxation-line level, that provides the taxation-line-item entities.

25. The computer of claim 8, wherein the processor is to further:
read transaction data in the transaction document;
determine a tax jurisdiction and taxation levels of the determined tax jurisdiction;
for each of the transaction-document lines in the transaction document, add a taxation line according to the taxation-line entity to the transaction document;
for each taxation line, add plural taxation-line items for corresponding taxation levels of the determined tax jurisdiction to the transaction document.

26. The computer of claim 8, wherein the processor is to further:
read transaction data in the transaction document;
determine a tax jurisdiction and taxation levels of the determined tax jurisdiction;
for each of the transaction-document lines in the transaction document, add a taxation line according to the taxation-line entity to an output document; and
for each taxation line, add plural taxation-line items for corresponding taxation levels of the determined tax jurisdiction to the output document.

27. The medium of claim 15, wherein the data schema is a hierarchical data schema having plural levels including a taxation-line level that provides the taxation-line entity, and a taxation-line-item level, below the taxation-line level, that provides the taxation-line-item entities.

28. The medium of claim 15, wherein the program when executed causes the computer to further:
read transaction data in the transaction document;
determine a tax jurisdiction and taxation levels of the determined tax jurisdiction;
for each of the document lines in the transaction document, add a taxation line according to the taxation-line entity to the transaction document;
for each taxation line, add plural taxation-line items for corresponding taxation levels of the determined tax jurisdiction to the transaction document.

29. The medium of claim 15, wherein the program when executed causes the computer to further:
read transaction data in the transaction document;
determine a tax jurisdiction and taxation levels of the determined tax jurisdiction;
for each of the document lines in the transaction document, add a taxation line according to the taxation-line entity to an output document; and
for each taxation line, add plural taxation-line items for corresponding taxation levels of the determined tax jurisdiction to the output document.

* * * * *

UNITED STATES PATENT AND TRADEMARK OFFICE
CERTIFICATE OF CORRECTION

| | | |
|---|---|---|
| PATENT NO. | : 8,615,452 B2 | Page 1 of 1 |
| APPLICATION NO. | : 11/081069 | |
| DATED | : December 24, 2013 | |
| INVENTOR(S) | : Wolfgang Bross et al. | |

It is certified that error appears in the above-identified patent and that said Letters Patent is hereby corrected as shown below:

In the Specification

In column 4, line 5, after "provide" delete "is".

In column 4, line 7, delete "FIG." and insert -- FIGS. --, therefor.

In column 9, line 8, delete "Patent." and insert -- Patent --, therefor.

Signed and Sealed this
Twenty-ninth Day of April, 2014

Michelle K. Lee
*Deputy Director of the United States Patent and Trademark Office*